US011967161B2

(12) United States Patent
Boyraz et al.

(10) Patent No.: US 11,967,161 B2
(45) Date of Patent: Apr. 23, 2024

(54) SYSTEMS AND METHODS OF OBSTACLE DETECTION FOR AUTOMATED DELIVERY APPARATUS

(71) Applicant: Amazon Technologies, Inc., Seattle, WA (US)

(72) Inventors: Hakan Boyraz, Seattle, WA (US); Baoyuan Liu, Bellevue, WA (US); Xiaohan Nie, Lynnwood, WA (US); Sheng Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 16/914,189

(22) Filed: Jun. 26, 2020

(65) Prior Publication Data

US 2021/0405638 A1   Dec. 30, 2021

(51) Int. Cl.
*G06T 7/73* (2017.01)
*B60W 60/00* (2020.01)
(Continued)

(52) U.S. Cl.
CPC ....... *G06V 20/64* (2022.01); *B60W 60/00256* (2020.02); *G05D 1/0094* (2013.01);
(Continued)

(58) Field of Classification Search
CPC .... G05D 1/024; G05D 1/0094; G05D 1/0274; B60W 60/00256; G06T 7/74; G06T 2207/10024; G06T 2207/10028; G06T 2207/30261; G06V 20/58; G06V 20/10; G06V 20/64; G06K 9/6288
See application file for complete search history.

(56) References Cited

U.S. PATENT DOCUMENTS 7,181,323 B1 * 2/2007 Boka ............... G01S 7/4004
                                                73/1.16
9,939,814 B1 * 4/2018 Bauer ............. G05D 1/0274
(Continued)

OTHER PUBLICATIONS

Anonymous, Kalman filter—Wikipedia, Jun. 4, 2020, Retrieved from the Internet: URL: https://en.wikipedia.org/w/index.php?title=kalman_filter&oldid=960667749.
(Continued)

*Primary Examiner* — Anne Marie Antonucci
*Assistant Examiner* — Connor L Knight
(74) *Attorney, Agent, or Firm* — Knobbe Martens Olson & Bear LLP

(57) ABSTRACT

The present disclosure generally relates to a system of a delivery device for combining sensor data from various types of sensors to generate a map that enables the delivery device to navigate from a first location to a second location to deliver an item to the second location. The system obtains data from RGB, LIDAR, and depth sensors and combines this sensor data according to various algorithms to detect objects in an environment of the delivery device, generate point cloud and pose information associated with the detected objects, and generates object boundary data for the detected objects. The system further identifies object states for the detected object and generates the map for the environment based on the detected object, the generated object proposal data, the labeled point cloud data, and the object states. The generated map may be provided to other systems to navigate the delivery device.

20 Claims, 6 Drawing Sheets

(51) Int. Cl.
  *G05D 1/00* (2006.01)
  *G05D 1/02* (2020.01)
  *G06K 9/00* (2022.01)
  *G06V 10/80* (2022.01)
  *G06V 20/10* (2022.01)
  *G06V 20/58* (2022.01)
  *G06V 20/64* (2022.01)

(52) U.S. Cl.
  CPC ........... *G05D 1/024* (2013.01); *G05D 1/0274* (2013.01); *G06T 7/74* (2017.01); *G06V 10/80* (2022.01); *G06V 20/10* (2022.01); *G06V 20/58* (2022.01); *G06T 2207/10024* (2013.01); *G06T 2207/10028* (2013.01); *G06T 2207/30261* (2013.01)

(56) References Cited

U.S. PATENT DOCUMENTS

| | | | |
|---|---|---|---|
| 10,196,104 B1* | 2/2019 | Kagami | B62D 57/032 |
| 11,144,057 B1* | 10/2021 | Ebrahimi Afrouzi | G05D 1/0274 |
| 2016/0282126 A1* | 9/2016 | Watts | H03K 19/17768 |
| 2017/0316333 A1* | 11/2017 | Levinson | G05D 1/0274 |
| 2018/0245922 A1* | 8/2018 | Zaphir | G01C 21/005 |
| 2018/0348346 A1* | 12/2018 | Vallespi-Gonzalez | G01S 13/865 |
| 2019/0279049 A1* | 9/2019 | Doria | G06V 20/56 |
| 2020/0160559 A1* | 5/2020 | Urtasun | G06K 9/629 |
| 2021/0223779 A1* | 7/2021 | Passot | G05D 1/0274 |
| 2022/0016778 A1* | 1/2022 | Sinyavskiy | B25J 9/1666 |

OTHER PUBLICATIONS

Feng et al., Deep Multi-modal Object Detection and Semantic Segmentation for Autonomous Driving: Datasets, Methods, and Challenges, Cornell University Library, NY, Feb. 21, 2019, 27 pages.

Hu et al., A survey on multi-sensor fusion based obstacle detection for intelligent ground vehicles in off-road environments, Frontiers of Information Technology & Electronic Engineering, Zhejiang University Press, Heidelberg, vol. 21 No. 5, May 1, 2020, 18 pages.

International Search Report and Written Opinion for PCT Application No. PCT/US2021/038835 dated Oct. 12, 2021 in 19 pages.

* cited by examiner

SYSTEMS AND METHODS OF OBSTACLE DETECTION FOR AUTOMATED DELIVERY APPARATUS

BACKGROUND

Regardless of the mode of commerce, vendors may often be required to provide, or have provided, some form of fulfillment services that allows for the distribution of items to consumers. In some embodiments, vendors, or groups of vendors, can engage with third-party fulfillment providers that include networks of transportation and transportation vehicles. Most of these fulfillment providers incorporate some form of human interaction that allows for the placement of items, such as packages, from a vehicle to a receiving location specified by the consumer. For various reasons, incorporation of human participation in portions of the fulfillment process, such as final delivery, can give rise to deficiencies in the delivery process, such as issues related to scaling, quality, consistency and safety.

Robotic solutions capable of manipulating and transporting high volumes of items may help automate item fulfillment processes, which specifically include transferring the items between locations (e.g., shipping or transporting the items to respective recipients). Generally described, robotic solutions can be characterized based on the level of autonomy utilized in the carrying out of one or more tasks. Such characterizations or modes of operation can include manual mode of operation (involving human control to travel between locations and deliver items), semi-autonomous mode of operation (involving at least some human control to travel between locations and deliver items), or fully autonomous mode of operation (involving no human control to travel between locations and delivery items). Such modes of operation can include mechanical and software components that monitors and control or the robotic solution based on inputs from various sensors and offline or previously generated map information.

Illustratively, robotic solutions may be configured to carry one or more payloads or items and transport the payloads between different locations, for example from a centralized delivery location to different item destinations. For example, a transportation vehicle carries hundreds of items for delivery to multiple geographic areas (for example, multiple neighborhoods). The transportation vehicle may release one or more of the robotic solutions to deliver a number of items within each particular neighborhood. Thus, the transportation vehicle may be the centralized delivery location from which the robotic solutions travel to deliver items when completing the final delivery of the fulfillment process.

One potential drawback to incorporating robotic solutions into fulfillment processes is the variation in the environments in which the robotic solutions may be required to operate. More specifically, in some scenarios, robotics solutions may be required to physically maneuver or traverse in certain environments making transportation of the items more difficult. For example, the certain environments may include variations in heights of the surface on which the robotic solutions travel, variations in the types of surfaces on which the robotic and automated solutions travel, or objects or obstacles in the path of the robotic and automated solutions traversing the certain environment. The variations, objects, or obstacles may cause difficulty for the robots and automated solutions due in part to different terrains to be traversed, shapes of the objects or obstacles, or other physical characteristics of paths traveled that create uncertainty in delivery of the items to the recipients. To provide advantages over existing automated robotic solutions, identification of variations, objects, and obstacles in the environment and the path would need to be performed as fast, if not faster, than the existing processes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
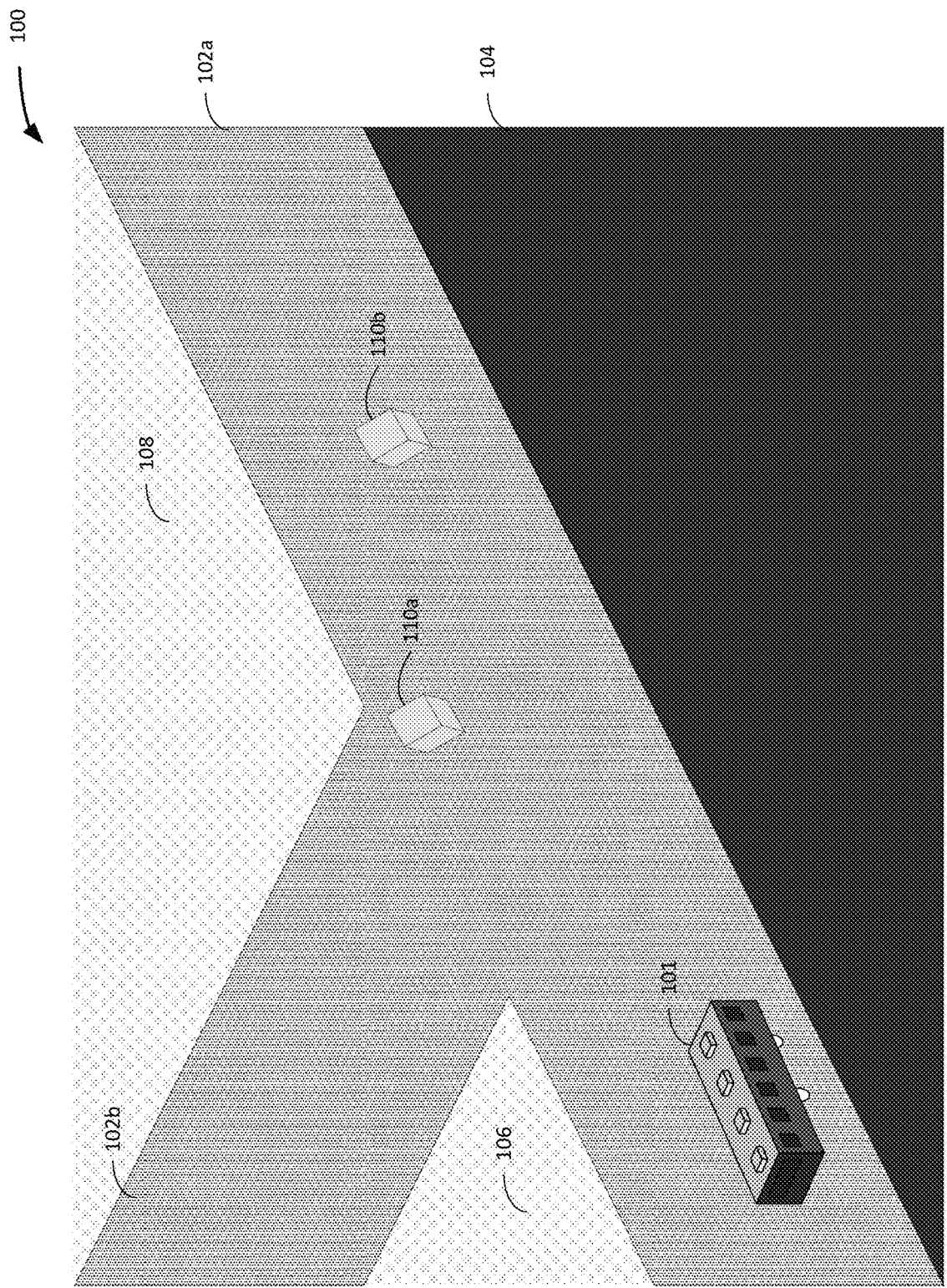
FIG. 1 is a diagram showing example terrains and obstacles that an autonomous system may face when transporting an item from a first location to a second location.

Fulfillment processes, as described herein, involve planning for and executing final delivery of items, which involves transporting the items to a final destination (for example, a recipient) from a distribution hub or similar centralized location. The final delivery typically relates to the final or last portion of the fulfillment process or service that involves delivering the item to the final destination from a last fulfillment provider location. In the e-commerce, retail, grocery, and similar industries, such last mile deliveries may include numerous challenges, including minimizing costs, ensuring transparency, increasing efficiencies, and improving infrastructure.

In many circumstances, the use of manned carriers (for example, involving or staffed by a person) to deliver items to recipients in the last leg or last mile of a distribution chain is a source for many of the challenges identified above. For example, the people used to perform the deliveries in the last leg often can generally only deliver one item (or a limited number of items) at a time, thereby increasing costs and decreasing efficiencies. Implementation of some form of autonomous robotic systems (hereinafter robotic systems) improves upon many of the challenges of involving some form of human interaction such as human delivery or manual robotic systems. However, autonomous or partially autonomous robotic systems may have difficulties navigating respective environments. For example, in one aspect, to achieve acceptable levels of performance, an autonomous or semi-autonomous robotic solution typically requires sufficient sensors to collect information regarding the environment of operation and processing resources for identifying terrains or detecting stationary objects or obstacles or detecting moving objects or obstacles in the environment. Such sensor systems, however, are of a high complexity and cost and require extensive processing to collect, process and generate large amounts of data to accurately identify terrains and detect potential objects or obstacles. An object, as described herein, may be something in the environment that the robotic system is able to identify as a known item. Thus, if the robotic system is able to detect an item in its environment and able to identify or label the item, then the item is referred to herein as an object. If the robotic system detects the item in its environment but is not able to identify or label the item, then the item is described herein as an obstacle. The robotic system may determine that both objects and obstacles are not navigable space. Additionally, in some embodiments, additional sensor data and processing resource can be required to account for and track moving objects and obstacles as they move through the environment of the robotic system and as the robotic system moves through the environment (more details to be provided below).

Many robotic systems may also utilize processing components that have difficulty working with and integrating large amounts of data from the various sensor systems with offline data to accurately identify the terrains and detect obstacles or moving objects. Such identification tasks need to be timely implemented to avoid obstacle collisions or disruptions to the fulfillment process. Further, such known sensor and processing systems may be expensive and bulky and generally difficult to efficiently and effectively incorporate in the smaller size of the robotic systems as compared to automated vehicles. In this regard, at least partially autonomous robotic solutions must not only work in the context of limited power consumption operating parameters, but a service provider will implement large number of robotic solutions that require the hardware and software processing resources to be implemented at scale. The systems and methods described herein provide for efficiently and effectively processing and integrating large amounts of data from different sensor types and offline resources to perform defined fulfillment tasks.

The present disclosure is generally related to a sensor and data analysis system for the robotic systems that assists with one or more aspects of fulfillment service. More specifically, aspects of the present application relate to sensor and data analysis for semi-autonomous or autonomous robotic systems to facilitate the traversal of terrain required to complete the fulfillment process, such as last leg or last mile delivery services. The robotic system may be any motorized vehicle able to traverse one or more of land, water, or air and convey one or more items or goods from a first location to a second location. As applied to the fulfillment services, the robotic system comprises a processing system that receives inputs from a number of sensors, for example RGB sensors, LIDAR, depth sensors, and the like, with new components and algorithms. The processing system collects and processes the different types of sensor data to perform different functions, such as generating point clouds and pose information for an environment of the robotic system, identifying terrains and terrain transitions in the environment (for example, the environment through which the robotic system travels when delivery an item to a destination along a path), and detecting and identifying obstacles within the terrain, and further identifying motion paths for identified obstacles that are not stationary and in the path environment. Illustratively, the processing system may utilize various algorithms to collect real-time or semi-real time sensor data from integrated RGB, LIDAR, and depth sensors and integrate and merge the collected sensor data with offline or previously generated map data. The processing system then uses the sensor data integrated with the offline map data to generate a probabilistic 3D map of the environment of the robotic system and identifies the terrains and objects/obstacles (including terrain and object types) in the environment on the generated map. As the robotic system moves and new sensor data is acquired, the processing system continuously combines and integrates the data to update the generated map to ensure updated information for terrain and object labels, and so forth. The robotic system uses the generated map to navigate between locations when completing the final delivery of items.

More specifically, the sensor and data analysis system described herein provides a sensor and data analysis framework that dynamically accepts and employs inputs as available to continuously generate a best possible interpretation of the robotic system's environment. With reference to an illustrative example, the sensor and data analysis system may have access to information from multiple sensors that provide information regarding a current environment (for example, RGB sensors, LIDAR sensors, and depth sensors) and historical information that includes map data defining object placement and potential traversal paths. Accordingly, the sensor and data analysis system may utilize the sensor data from these three sensor systems to generate at least a partial map information from the combination of available sensor data. The sensor and data analysis can further associate different partitions or aspects of the generated map data with different confidence values based on attributes of the sensors.

In another illustrative example, assume a sensor and data analysis system has access to an existing map but only RGB sensors. In accordance with aspects of the present application, the sensor and data analysis system uses the available map and RGB data to generate map information based on a combination of the data. The sensor and data analysis system can associate confidence values for the partitions in the generated map being based on the two sets of data (RGB sensor data and existing map data) available when generating the map. Thus, the sensor and data analysis system utilizes the best available data to generate the best possible map to enable the robotic system to navigate its environment.

Generally described, the incorporation of dynamic processing capabilities in the sensor and data analysis system facilitates, or enables, devices using the sensor and data analysis system to operate, or otherwise improve operations, in various circumstances. More specifically, the sensor and data analysis system may be implemented with devices with various sensor capabilities and inputs available, which can vary dynamically based on the current operating environment, availability of sensor data, and variances in the quality and quantity of the available sensor and historical data. In this way, if the robotic system travels or is used in an environment for which an existing map is not available or when one or more sensors are unavailable, the sensor and analysis data analysis system can still generate the map for the robotic system to use for navigation without having to be newly configured or adapted. Additionally, the sensor and data analysis system can facilitate traversal of different environments in which sensor data, such as from a local sensor, may have different quality parameters, such as camera systems that may vary according to weather, time of day, or other environment factors.

Illustratively, the processing results generated by the sensor and data analysis system may correspond to a three-dimensional (3D) representation of the environment around the robotic system, including dynamic and stationary objects. Such a 3D representation can be provided to navigation or traversal components that enables a mobile robotic system to navigate through different environments based on the 3D representation. Illustratively, in some aspects, the representation can include information that allows the navigation or traversal components to identify and adapt to uneven terrain and semantically different surfaces. For example, the 3D representations can include information that direct or indirectly identifies semantically different surfaces so that a navigation or traversal component can select travel paths to avoid some types of surfaces or potential navigation obstacles. For example, the 3D representation can identify driveway surfaces that may have surface attributes that have been characterized as being potential obstacles to allow a robotic device to avoid traveling on driveways even though the driveway is the same terrain and/or surface as a sidewalk on which the robotic system is able to travel.

Still further, the 3D representation may enable the robotic system to utilize confidence level information for detected terrains, objects, and obstacles so that motion planning algorithms for the robotic system can select spaces having higher confidences for navigation. For example, a robotic system can utilize the confidence information in both the filtering of potential paths including identified obstacles associated higher degrees of confidence (or threshold degree of confidence). In another example, a robotic system can select a path with identified obstacles with a characterized higher degree of confidence that may be traversable in favor of other paths in which obstacles or obstacle attributes may not be associated with a higher degree of confidence and could results in unexpected difficulties during traversal.

In accordance with an illustrative example, a robotic system can be configured to be loaded with one or more items. The robotic system can be further configured to be released from an initial launch position, such as a transportation vehicle (for example, a truck parked on a street or in a parking lot), and instructed to traverse terrain to provide one of the loaded items to a destination. The configuration can include a recipient's address (for example, a house, apartment, storefront, or other destination) that can be readily identified by the robotic system utilizing data connectivity.

With continued reference to the illustrative example, the robotic system is initiated (such as offloaded from the transportation vehicle) and autonomously attempts to travel from its initial destination and the address using a probabilistic 3D map of the robotic system's environment. The sensor and data analysis system of the robotic system may generate the probabilistic 3D map that includes offline map data of the environment, including pre-configured map data and historical data regarding previous traversals of the terrain. The robotic system then collects and supplements the offline map data with real-time processed data from various sensors, including RGB sensors, LIDAR sensors, depth sensors, and so forth. The robotic system then uses the dynamically generated probabilistic 3D map information to identify the traversal path for robotic system in an attempt to avoid collisions or disruption of the fulfillment service. In this regard, the resulting, generated probabilistic 3D map information can be continuously updated to account for dynamic obstacles or changes in the terrain while leveraging the historically provided or processed information for more stationary, time-independent obstacles. Using the systems and processes described herein, the robotic system is able to quickly and efficiently navigate through the environment to complete the final delivery that avoids non-traversable terrains or objects or obstacles. The robotic system generates a path through the environment with reduced costs, processing, and resource consumption as compared to existing systems due to the combining of data from disparate sensors further combined with existing mapping data, as described herein.

FIG. 1 is a diagram of a street view 100 showing example terrains and obstacles in an environment that a robotic system 101 may traverse when transporting an item from a first location to a second location. The street view 100 includes a portion of a roadway 104, a sidewalk 102, a first yard 106, and a second yard 108. The sidewalk 102 has a first portion 102a that runs substantially parallel to the roadway 104 and a second portion 102b intersecting the first portion 102a at approximately a 90° angle. Each of the roadway 104 and the sidewalk 102 may be a distinct terrain, and a curb, though not shown in this figure, may separate the sidewalk 102 from the roadway 104. For example, the roadway 104 may have a substantially smooth and consistent surface, relative to the vehicles that travel on the roadway 104 (for example, cars, trucks, and so forth). The transportation vehicle may be responsible for delivering a number of items to a number of different recipient addresses may travel on the roadway 104 using one or more robotic systems 101 and dispatches the one or more robotic systems 101 to deliver items to addresses. The transportation vehicle may correspond to the first location when the transportation vehicle is parked on the roadway 104 (or in a parking lot, and so forth). Each recipient address may correspond to a different second location. The sidewalk 102 may have a substantially smooth surface, though the surface of the sidewalk 102 may be less smooth and be more susceptible to inconsistencies as compared to the roadway 104, relative to the vehicles and pedestrians that travel on the sidewalk 102. Because the vehicles, such as the robotic system 101, that travel on the sidewalk 102 are generally smaller than those vehicles that travel on the roadway 104, the robotic system 101 may be more susceptible to smaller imperfections in the sidewalk 102 surface.

The second portion 102b of the sidewalk 102 separates the first yard 106 from the second yard 108. The first yard 106 may comprise a first terrain of grass, while the second yard 108 may comprise gravel, dirt, turf, or any other appropriate terrain in a second yard on another side of the second section of the sidewalk 102. Thus, if the robotic system 101 travels from the transportation vehicle on the roadway 104 (i.e., the first location) to the recipient across one of the first yard or the second yard (i.e., the second location). Thus, the robotic system 101 transporting an item from the first location to the second location travels across at least two different terrains (e.g., at least the asphalt of the roadway 104 and the concrete of the sidewalk).

The robotic system 101 may use a sensor or similar stack or perception system (hereinafter referred to as the perception system) to enable the functionality described herein. For example, the perception system enables the detection and separation of terrains around the robotic system 101 to generate a dense local terrain elevation map or model (referred to herein as a map) of the environment. The robotic system 101 may use this map to determine a traversability score that measures how traversable each pixel or portion of the map is relative to other pixels or portions of the map. In some embodiments, the robotic system 101 also uses the perception system to label a terrain map or model (referred to herein as a map) with determined surface or terrain types (for example, sidewalk, road, curb, driveway, crosswalk, parking lanes, grass, and so forth). In some embodiments, the robotic system 101 uses the perception system to label the terrain elevation map with the determined surface or terrain types. The robotic system 101 may label items in the map (for example, pixels, partitions, objects, etc., identified in the map) with labels having semantic meaning, via the perception system. For example, the robotic system 101 may label a known item 110*a* in the path of the robotic system 101 as an object or as a particular object while the robotic system 101 labels an unknown item 110*b* in the path of the robotic system 101 as an obstacle.

The perception system may also enable the detection and avoidance of obstacles or people in the environment of the robotic system 101. The perception system may also enable the robotic system 101 to distinguish driveways from sidewalks (as described above) and, thus, avoid driving up sidewalks when inappropriate to do so or avoid entering into garages, patios, houses, and so forth, at which the robotic system 101 is delivering items.

Figure 2:
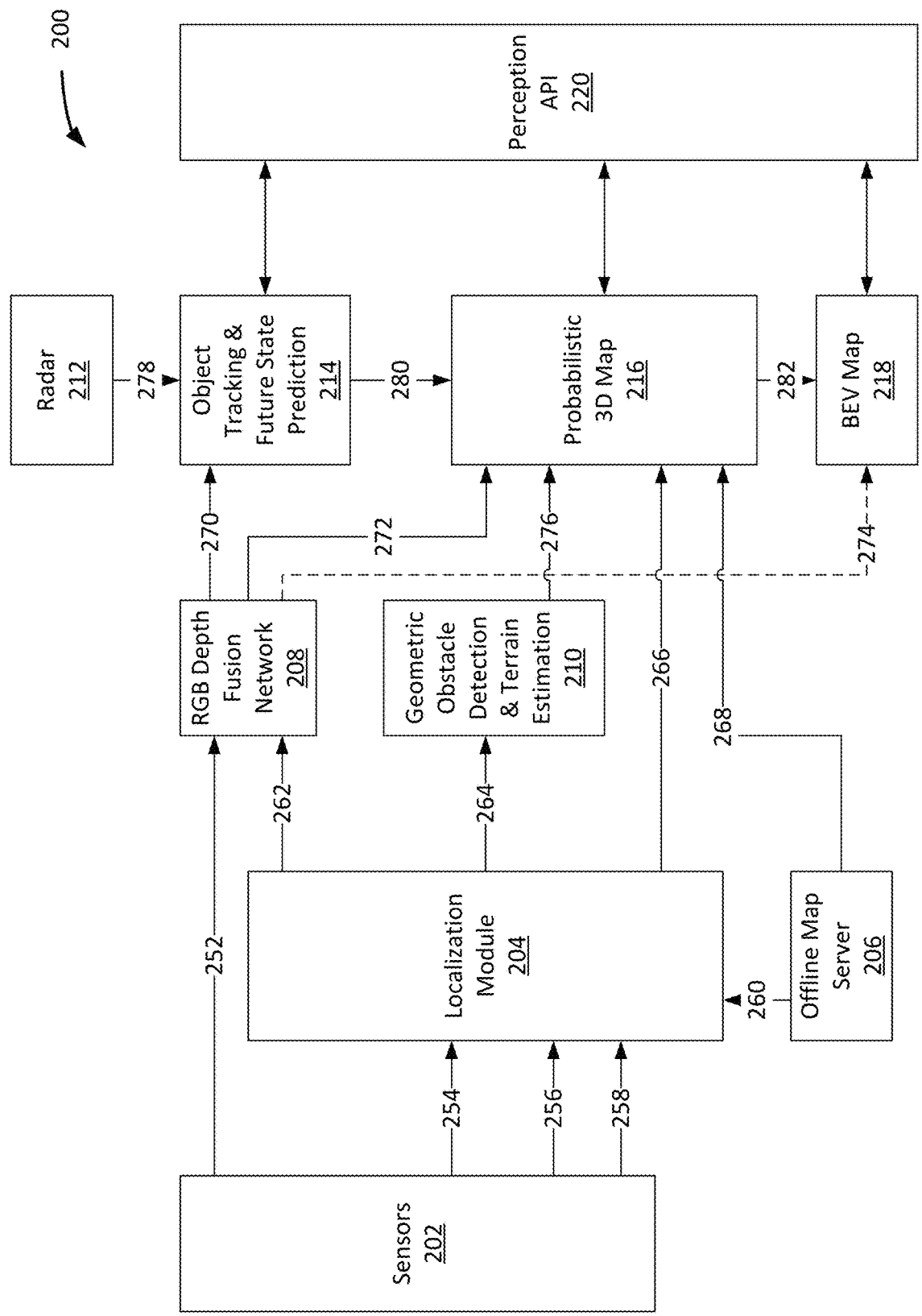
FIG. 2 is a flow diagram showing an illustrative perception system used to acquire information for and perform one or more functions described herein for the autonomous system of FIG. 1 to autonomously travel from the first location to the second location.

The perception system 200, as shown in further detail with respect to FIG. 2, may include a plurality of sensors, such as stereo depth sensors (for example, cameras or imaging sensors) for terrain and obstacle detection and RGB sensors (for example, light sensors or cameras that detect a color of a reflected surface and context information of neighboring pixels in a corresponding image) for semantic segmentation. Such context information (also referred to as neighboring pixel data) may include information or relationships with objects represented by nearby or neighboring pixels in a captured image that is used in classifying images that include those pixels. Furthermore, the robotic system 101 may include additional or different sensor technologies instead of, or in conjunction with, the stereo depth and RGB sensors to improve the terrain and object detection (and similar) functions described herein and to make the robotic system 101 more robust and less susceptible to sensor failures or errors. Thus, the challenging unstructured sidewalk environments (for example, often including low profile obstacles such as sports equipment, trashcans, mailbox features, fencing features, street lighting features, and general neighborhood obstacles such as parked cars, misplaced bicycles, toys, skateboards, and the like) may be more completely imaged or analyzed. In some embodiments, the sensors used in the robotic system 101 include active dense ranging sensors, such as a scanning or solid-state light detection and ranging (LIDAR) sensor, though other active ranging sensors are contemplated. While any one sensor or sensor type may be successful in detecting and capturing a subset of information, fusing data from various types of sensors may provide for a robust perception system. For example, fusing context rich data obtained from one or more RGB sensors with sparser but highly accurate range information obtained from one or more LIDAR sensors provides a more robust perception system than perception systems using only one of RGB or LIDAR sensors.

As described in further detail below with respect to FIGS. 2-4, the perception system described herein provides various benefits over current systems. For example, the perception system employed in the robotic system 101 may perform data integration across multiple sensors of the same or different types as well as data integration across multiple frames. This perception system may further enable robust object detection and pose estimation of said object based on combined RGB and dense range data, thereby enabling robust obstacle detection and terrain estimation. The robotic system 101 may use the perception system described herein to generate a probability map representation that enables modeling of one or more of occupied, free, or unseen regions. In some embodiments, different types of regions may include different state information; for example, occupied regions may include one or more state information such as ground, traversable/non-traversable, obstacle, or semantic labels. In some embodiments, the semantic labels (for example, for objects) can include, but are not limited to, "sidewalk", "road", "driveway", "ramp", "curb", "lawn", "sky", "terrain", "bush", "trash can", "mailbox", "pole", "pedestrian", "car", "emergency vehicle", "bicycle", "bicyclist", "stroller", "wheelchair", "traffic light", "construction sign", "fire hydrant", "dog", "cat", and "generic obstacle", among others. Additionally, the perception system may enable future state prediction for dynamic agents identified with the multiple sensors. Additionally, the perception system described herein may determine a semantic representation of each partition of an environment around the robotic system 101 based on fusing data from the multiple sensors of the robotic system 101. The perception system also generates a probabilistic map representation that can be reviewed across time, accounting for changes in confidence levels for information in particular partitions or cells of the probabilistic map representation.

Some existing systems (for example, autonomous vehicles and the like) use offline, annotated terrain maps and then accurately localize the environment using LIDAR or similar equipment and look for dynamic objects in the scene (for example, other vehicles, pedestrians, bicyclists, and so forth). Such systems must have high accuracy LIDAR sensors and processing due to the speeds and related concerns specific to autonomous vehicles but may be unable to detect all objects (for example, objects smaller than a person or a bicycle). While the autonomous vehicles may have localization accuracy of tens of meters in a forward direction, the robotic system 101 may require a localization accuracy of 10-50 centimeters. Thus, the perception system of the robotic system 101 may only need to reliably construct a local representation of the environment around the robotic system 101 within tens of centimeters to the robotic system 101 and only have to detect objects and obstacles within that environment of tens of centimeters and track only those dynamic objects and obstacles within that environment. The perception system may also only need to perform semantic segmentation of the environment within the tens of centimeters (for example, determining where the robotic system 101 can or cannot travel). Thus, using the perception system, the robotic system 101 may avoid driving on lawns or through gardens, may avoid unintentionally driving on the road and may avoid obstacles in its path while delivering items from the first location to the second location.

FIG. 2 is a flow diagram showing an illustrative perception system 200 used to acquire information for and perform one or more functions described herein for the robotic system 101 of FIG. 1 to autonomously travel from the first location to the second location. The perception system 200 may be a stack that includes sensors and processing components to reliably construct a local representation of an environment of the robotic system 101. The perception system 200 may enable detection of objects or obstacles in the environment of the robotic system 101 and allow the robotic system 101 to track or predict movement of the objects or obstacles. Such tracking or prediction of movement of the objects or obstacles enable the robotic system 101 to generate a path for the robotic system 101 to travel while avoiding (for example, travel around) the objects or obstacles.

The perception system 200 may include, but is not limited to, one or more of a plurality of sensors 202, a localization module 204, an offline map server 206, an RGB depth network module 208, a geometric obstacle detection and terrain estimation module 210, a radar module 212, an object tracking and future state prediction module 214, a probabilistic three-dimensional ("3D") map module 216, a birds-eye-view (BEV) map module 218, and a perception application programming interface (API) 220. The various modules of the perception system 200 may use data from the sensors 202 to generate a data flow and ultimately generate map information and future state predictions for use or analysis by the perception API 220. The perception system 200 may combine information from the plurality of sensors 202 with a network of devices that is trying to detect random 3D objects, perhaps classifying the detected objects using semantic segmentation, do terrain prediction (for example, is a particular portion of the environment traversable or non-traversable terrain) and generate a terrain model. In some embodiments, the semantic segmentation is performed using machine learning ("ML"). For example, determining, using an integration of information from various sensors, whether a partition of a map will be labeled as sidewalk or trashcan is performed using a ML or similar system trained to identify a number of different objects (for example, as listed above related to the semantic labels). Details of the data flows, map generation, and use or analysis is provided below.

The sensors 202 may include a plurality of sensors, including a plurality of RGB sensors disposed on a front or front surface or a back or back surface of the robotic system 101, a plurality of ultrasonic sensors, a time-of-flight (TOF) sensor, stereo sensors, a LIDAR sensor, and so forth. The RGB sensors may include, but is not limited to, three RGB sensors with overlapping fields of view, where the three RGB sensors provide approximately a 180° horizontal field of view (each RGB sensors having approximately 70° horizontal field of view that overlaps with the neighboring RGB sensor(s)) and approximately a 110° vertical field of view in front of the robotic system 101. The RGB sensors may be used to generate RGB sensor data. The sensors 202 may also include an RGB sensor disposed at the back or rear of the robotic system 101. The sensors 202 also include a plurality of stereo depth sensors having similar fields of view or placements as the RGB sensors. The stereo depth sensors may be used to generate depth data.

The sensors 202 further comprise a single LIDAR sensor mounted at the front of the robotic system 101 and configured to capture at least a fraction of the approximately 180° horizontal and 110° vertical fields of view of the RGB sensors. For example, the single LIDAR comprises a solid state LIDAR with 110° horizontal and 32° vertical fields of view. The sensors 202 may also include the TOF sensor mounted at the front of the robotic system 101 to provide up to one meter depth information coverage from the bottom of the robotic system 101. The sensors 202 may be disposed to identify a 360° environment of the robotic system 101. The sensors 202 provide image, environmental, and corresponding data to various modules of the perception system 200. In some embodiments, the inputs from particular individual or single types of sensors may be insufficient to detect feature-less or certain objects (for example, a skateboard resting on the sidewalk). For example, stereo depth sensors alone may have difficulty detecting the skateboard in such a scenario. Thus, data from multiple types of sensors may be combined together to improve detection capabilities of the sensors 202 and the perception system 200 as a whole. For example, the sensors 202 provide RGB data 252 to the RGB depth network 208. The sensors 202 also provide (1) LIDAR, stereo depth, and TOF sensor data 254, (2) RGB data 256, and (3) GPS and IMU data 258 to the localization module 204. The localization module 204 also receives offline map data 260 from the offline map server 206, which also provides local offline map data 268 to the probability 3D mapping module 216. The localization module 204 generates three output data flows: (1) a combined dense point cloud and 3D pose information data 262 in an Odom frame to pass to the RGB depth network 208; (2) a combined dense point cloud and 3D pose information data 264 in an Odom frame to pass to the RGB depth network 208; and (3) 3D pose and covariance matrix data 266 in map and Odom frames for the geometric obstacle detection and terrain estimation module 210. In some embodiments, the offline map data 260/268 includes 2D or 3D information having confidence scores associated therewith (for example, as provided by the localization module 204 or the offline map server 206). These confidence scores may be used when integrating or otherwise fusing the offline map data 260/268 with the map data generated by the probabilistic 3D map module 216. Details regarding scores are provided below.

The RGB depth network module 208 generates three (3) outputs based on the data received from the sensors 202 and the localization module 204. These outputs include: (1) 3D object proposal data 270 that is passed to an object tracking and future state prediction module 214; (2) labeled point cloud data 272 (for example, including terrain or obstacle data or semantic classes) to pass to the probabilistic 3D map module 216; and (3) curb traversability prediction data 274 passed to the BEV map module 218. In some embodiments, RGB depth network module 208 may combine data from one or more of the RGB sensors, LIDAR sensors, TOF sensors, or the stereo depth sensors to perform 3D object detection, semantic segmentation, terrain prediction, and depth prediction for partitions of the environment around the robotic system 101. Without limitation, the 3D object can include, but is not limited to one or more of a car, an emergency vehicle, a bicyclist, a pedestrian, a stroller, a wheelchair, a trashcan, a dog, a cat, and various other obstacles.

The geometric obstacle detection and terrain estimation module 210 receives the combined dense point cloud and 3D pose data in the Odom frame from the localization module 204 and generates labeled point cloud data 276 to pass to the probabilistic 3D map module 216. In some embodiments, the geometric obstacle detection and terrain estimation module 210 may be used to detect an object or obstacle in the environment of the robotic system 101 and classify or determine a type of object or obstacle of the detected object or obstacle (for example, a bush, a mailbox, a vehicle, and so forth). In some embodiments, the geometric obstacle detection and terrain estimation module 210 be a redundant module that provides redundant data as the RGB depth network 208. For example, the geometric obstacle detection and terrain estimation module 210 may generate an overlay of terrain and obstacles based on geometric or depth data with lower latency as compared to, for example, the RGB depth network module 208, which may operate at lower frame rates but higher accuracy levels. However, using the perception system 200, the object detection information from both the geometric obstacle detection and terrain estimation module 210 and the RGB depth network module 208 may be combined with the probabilistic 3D map module 216, as discussed below.

The radar module 212 can include, but is not limited to, one or more RADAR or similar sensors used to generate an output of 3D object proposals data 278. The object tracking and future state prediction module 214 may receive 3D object proposals data 278 from the radar module 212 and 3D object proposal data 270 from the RGB depth network module 208 and generates an output of object states data 280 to send to the probabilistic 3D map module 216. In some embodiments, the object tracking and future state prediction module 214 receives 2D or 3D bounding boxes from one or more of the RGB depth network 208 or the radar module 212. The object tracking and future state prediction module 214 may use such data to track objects in the environment of the robotic system 101 and detect, apply, or update state information for each dynamic object, including trajectory and the like. The state information may include information about the movement of the dynamic object, location of the dynamic object, object type, and so forth. This information may be used in controlling navigation of the robotic system 101. The object tracking and future state prediction module 214 may also communicate with the perception API 220. The perception API 220 may enable the perception system 200 to interface with various aspects or components of the robotic system 101.

The probabilistic map module 216 receives the labeled point cloud data 272 from the RGB depth network module 208, the labeled point cloud data 274 from the geometric obstacle detection and terrain estimation module 210, the 3D pose and covariance matric data 266 in the map and Odom frames from the localization module 204, the local offline map data 268 from the offline map server 206, and the object states data 280 from the object tracking and future state prediction module 212 to generate projection data 282 to pass to the BEV map module 218. The probabilistic map module 216 may also communicate with the perception API 220. The perception API 220 may enable data and projection maps and information generated by the probabilistic 3D map module 216 to interface with and be used by various aspects or components of the robotic system 101. The 3D map generated by the probabilistic 3D map module 216 may include semantic information in addition to occupancy information, where each cell or partition of the generated 3D map has its own set of attributes. The set of attributes may include occupancy information (occupied or unoccupied), is the cell terrain or not terrain, if terrain, what type of terrain (for example, lawn, sidewalk, roadway, and so forth), obstacle type if not terrain (for example, bush, mailbox, and so forth). In summary, the probabilistic 3D map module 216 may receive the analysis and information from the various components of the perception system 200 (for example, the RGB depth network module 208, the geometric obstacle detection and terrain estimation module 210, the object tracking and future state prediction module 214, the offline map server 206, and the like and fusing them into a 3D partition (or cell) representation of the environment of the robotic system 101. In some embodiments, each of the inputs that the probabilistic 3D map module 216 receives has associated confidence levels, and the probabilistic 3D map module 216 may combine the data from each of the inputs in a probabilistic manner while accounting for which inputs provide the best (i.e., most confident) information or the most information. For example, the inputs with higher confidence or most information may be higher in a hierarchy of information than lower confidence data or data with less information. Thus, the probabilistic 3D map module 216 may perform a second level of integration where it combines previously combined sensor data (for example, as part of the data labeled point cloud data 272 from the RGB depth network module 208, the object states data 280 from the object tracking and future state prediction module 214, the labeled point cloud data 276 from the geometric obstacle detection and terrain estimation module 210, the 3D pose and covariance matrix data 266 in the map and Odom frames, and the offline map from the offline map server 206) into a single representation (for example, a 3D probabilistic map).

The 3D probabilistic map may represent the environment around the robotic system 101. The 3D probabilistic map may combine sensor data and other relevant information across time and from different sources. The 3D probabilistic map may comprise a 3D voxel map with varying grid sizes, where closer grids have a higher resolution (for example, 4×4 centimeters) whereas distance grids have a lower resolution (20×20 centimeters). Each grid cell (or partition) can include information about the environment, including:
    A characterization of whether or not the cell is occupied,
    A characterization of whether any identified obstacle corresponding can be further characterized as cell terrain or obstacle/object,
    A characterization of whether any cells identified as terrain can be further characterized into a set of classes of the terrain: sidewalk, road, lawn, driveway, etc.,
    A characterization of whether any cells identified as obstacle/object can be further characterized into a set of classes the object (for example, person, car, pet, trash can, mailbox, bicycle, wheelchair, stroller, other) or unknown (obstacle),
    A further characterization of an associated probability with each characterized class label, etc.

The perception system 200 may update states of each cell of the 3D probability map using a Bayesian model (such as a Kalman filter). The updated states for each cell may maintain probability distributions of each cell over class labels and every hypothesis to update state probability of the 3D cell. The Bayesian model (i.e., the Kalman filter) may assume a multivariate Gaussian distribution for the cell state for each cell. In an illustrative example, each state is a single value showing a probability of the cell being occupied. When a new prediction (for example, at a subsequent time or due to a subsequent scan) includes an updated probability of occupancy for that cell (and some associated measurement error that needs to be calculated offline via sensor analysis; for example, depth based predictions can be more accurate as a function of distance), the probabilities for that cell are updated using, for example, a Kalman filter update function. Offline map data (for example, from the offline map server 206) may comprise another hypothesis about the environment. The perception system 200 may use ray tracing (or a similar method) to update the probability values for cells that were on the ray from the sensor(s) to the obstacle/point. The perception system 200 may use 3D boundary box estimates from the 3D object detection modules (for example, modules 316, 426, and 524) to decide which regions or cells of the 3D probabilistic map have a longer memory vs shorter memory. For example, cells that are occupied by a dynamic agent or moving object (for example, a person) may potentially change state while cells occupied by static agents or objects (for example, a tree) would not change state as often as those occupied by the dynamic object.

In some embodiments, the perception system 200 assigns confidence values to generated data, received data, and so forth. For example, the semantic segmentation or the depth completion information included in every point cloud in the labeled point cloud data 272 will have its own confidence value or score. Thus, the data shown will indicate how confident the perception system 200 is in that value. For example, output of the RGB depth network module 208 is a semantic map indicating for each pixel a breakdown of probabilities, for example that a particular pixel is a sidewalk (the sidewalk label having an associated confidence score of 80%) or a road (the road label having an associated confidence score of 20%). Since the pixel distribution of probability is 100% for each pixel, the confidence score for the pixel is determined based on the distribution of probabilities for the individual pixel. These confidence levels may be assigned by the RGB depth network module 208 (or the respective module that generated the associated value). The confidence scores associated with the offline map come from the localization module 204, where the confidence score is related to how confident the perception system 200 is that a location of the robotic system 101 relative to the offline map (from the offline map data 260) is accurate. The 3D pose and covariance matrix data 266 generated by the localization module 204 may indicate its confidence, for example relative to the offline map.

In some embodiments, an ML network or system described herein is trained to produce a percentage or confidence score indicating a probability that a label is accurate. For example, when the ML network or system (for example, associated with the RGB depth network 208) identifies a partition or pixel as having a particular label, the ML network also identifies a corresponding likelihood that the partition or pixel is the sidewalk and any other percentages that the partition or pixel could be anything else (for example, a road or person). Thus, after fusing the sensor data available, the ML network may determine that a particular pixel is 99% likely to be a sidewalk based on the combination of the sensor data. The perception system 200 may then generate a semantic map based on each pixel and its corresponding probability.

The BEV map module 218 may use the labeled point cloud data 274 received from the RGB depth network 208 and the projections data 282 received from the probabilistic 3D map module 216 to generate map information for use by the robotic system 101 in transporting items on the last leg of the distribution chain described above. In some embodiments, the projections data 282 can include, but is not limited to, 3D map data. The BEV map module 218 may communicate with the perception API 220, which enables map data generated by the BEV map module 218 to interface with and be used by various aspects or components of the robotic system 101 (for example, a navigation system of the robotic system 101). In some embodiments, The BEV map module 218 may project the 3D map data received from the probabilistic 3D map module 216 onto a 2D BEV map for use by the robotic system 101 to navigate through the environment of the robotic system 101. Additionally, the BEV map module 218 may combine additional information (for example, the curb traversability prediction data 274 and so forth) when generating the map for user in navigating the robotic system 101. Additionally, the perception system 200 may combine or integrate information from the object tracking and future state prediction module 214, for example, information about dynamic objects in the environment, such as people, cars, bicyclists, and so forth with the probabilistic 3D map generated by the probabilistic 3D map module 216 or the 2D BEV map generated by the BEV map module 218.

In the perception system 200, as described above and as shown in FIG. 2, the sensors 202 (including the RGB, the stereo depth sensors, and the active ranging sensor) provide the initial data used by the perception system 200. Various modules (for example, the localization module 204 and the RGB depth network 208) use or combine the sensor data. For example, the localization module 204 may use data received from the sensors 202 (for example, the LIDAR, stereo depth, and TOF data 254, the RGB data 256, and the GPS and IMU data 258) to determine a location for the robotic system 101 in an environment and generate the combined dense point cloud and 3D pose data 262 and 264. For example, the localization module 204 may combine data from one or more sensors at a single aligned or synchronized time to determine or identify the location of the robotic system 101 based on the synchronized or aligned data. Thus, the localization module 204 may perform temporal fusion of the sensor inputs received from the available sensors of the sensors 202 to derive the location of the robotic system 101. This location information, which may be indicated or otherwise used to generate the combined dense point cloud and 3D pose data 262 and 264, may be used to fuse or combine sensor data (for example, RGB sensor data with depth data or range data from the LIDAR). The location information generated by the localization module 204 can be used to track locations of moving objects or obstacles or stationary object or obstacles while the robotic system 101 is stationary or moving.

By way of illustrative example, the localization module 204 may receive sensor data (e.g., a scan of the environment) at a first time t=0 and generate a first 3D representation via the dense point cloud and 3D pose data 262 and 264. At a second time t=1, the localization module 204 may receive updated sensor data for t=1 and generate a second 3D representation via the dense point cloud and 3D pose data 262 and 264 representing the second time. In combination, the dense point cloud and 3D pose data 262 and 264 for the different times may provide more detail of the environment as compared to any single time point cloud and pose data as well as provide for tracking of stationary or moving objects or obstacles.

The RGB depth network 208 may combine the RGB data 252 and the combined dense point cloud and 3D pose data 262 to generate the 3D object proposal data 270, the labeled point cloud data 272 (for example, including terrain or obstacle data or semantic classes), and the curb traversability prediction data 274. In some embodiments, the fusing involves information from various sensors and sensor types with different levels of accuracy and different types of acquired data (for example the context rich data obtained by the RGB sensors with point cloud data generated from an active ranging sensor). Such fusing of data from different sensors across time may relies on accurate extrinsic calibration, time synchronization, or 3D pose estimation information. The fusing may be performed by a localization stack or by the perception system 200 (for example, using 3D pose graph provided by the localization module 202). Additionally, the RGB depth module 208 may receive time-synchronized RGB images (for example, the RGB data 252 from the sensors 202 and aligned point cloud data (for example, the combined dense point cloud and 3D pose data 254 in the Odom frame (where the 3D pose of the robotic system 101 is at the time of the data capture by one or both of the RGB sensors and LIDAR sensors. As described above, the RGB depth module 208 outputs:

(1) 3D object proposal data 270, which can include, but is not limited to 2D and 3D BEV bounding boxes for objects of interest (for example, cars, pedestrians, bicyclists, wheelchairs, stroller, trash cans, mail boxes, and the sort);

(2) labeled point cloud data 272 (for example, including terrain or obstacle data or semantic classes), which may include segmented dense point cloud schemes, where each point is classified as terrain or non-terrain; when the point in the cloud data is classified as terrain, the point will be further labeled based on the terrain type (for example, sidewalk, road, driveway, lawn, curb, crosswalk, etc.); when the point is classified as non-terrain, the point will be further labeled by general obstacle class & vegetation class; and (3) curb traversability prediction data 274 passed to the BEV map module 218, which may include, but is not limited to BEV terrain elevation information or map.

When the LIDAR or other active ranging sensor resolution does not match a resolution of the RGB sensors (for example, the scanning LIDAR has 64 scan lines and 60 degrees field of view and has ~2 meter resolution in a longitudinal direction at 10 meters on the terrain surface), the robotic system 101 may use the RGB depth module 208 to predict a dense depth from the input point cloud combined with the RGB sensor data and stereo depth sensor data.

Current autonomous driving systems may combine RGB sensor data and LIDAR sensor point cloud data for 3D object detection. Those systems may use sensor data fusing that is categorized as early, late, or deep-integration. The categorization of the fusing of sensor data may be based on when the data is combined when processing for further analysis or decisioning. Late and deep integration approaches may be applicable to multiple views. However, the late and deep integration techniques are generally used for object classification and detection tasks, where integration is easier via region of interest (ROI) pooling. Early integration techniques may be applied to tasks that require pixel level classification (for example, semantic segmentation, general obstacle detection or elevation map prediction, and so forth). However, when multiple views are to be combined, such early integration techniques get more complicated because spatial correspondences need to be preserved when fusing features from different modalities and viewpoints. The technology described herein improves upon limited current techniques and networks for spatially aligned point wise integration.

While the perception system 200 is described above with reference to FIG. 2, the perception system 200 may provide a framework by which a varying number of inputs (for example, sensor inputs from the sensors 202 or map inputs from the offline map server 206) can be processed to generate a map of the environment of the robotic system 101. As described above, while the perception system 200 can use the combination of the sensors 202 as described above, the perception system 200 may equally operate with a fewer number of inputs from sensors or map sources, albeit with potentially reduced or different confidence levels.

As also previously referenced, the perception system 200 may generate the probabilistic map via the probabilistic 3D map module 216 based on only the RGB data 252 as processed via the RGB depth fusion network 208. The perception system 200 may be flexible enough to incorporate or integrate additional data (for example, from other sensors of the sensors 202 or map data) as it is available. For example, if the robotic system 101 operates in a new environment where map data from the offline map server 206 is not available, the flexible framework still allows the perception system 200 to generate the probabilistic map based on the limited input information. Similarly, if the robotic system 101 operates with technical issues limiting use to a reduced number of sensors of the sensors 202, the perception system 200 uses its flexible framework to still generate the probabilistic map. Where a reduced number of inputs is used to generate the probabilistic map, the perception system 200 may calculate reduced confidence levels in determinations made based on the reduced number of inputs. The flexible framework of the perception system 200 may easily incorporate additional inputs as or if they are available, enabling the perception system 200 to scale dynamically from a single sensor to all identified sensors of the sensors 202. As more inputs are available to the perception system 200, the perception system can improve the probabilistic map for the robotic system 101. The perception system 200 can also combine or merge the confidence values as appropriate when multiple inputs are available.

In some embodiments, the perception system 200 combines sensor data from various or multiple separate sensor viewpoints. Various methods of fusing the sensor data described herein are provided below with reference to FIGS. 3 and 4. For example, the perception system 200 may project a point cloud into each sensor viewpoint and generate a set of features from the point cloud, for example one or more of range, azimuth angle, or intensity. The data generated from projecting data from the point cloud into sensor viewpoints may be stored separately or a blending of data. FIG. 3 is a flow diagram 300 showing two backbone networks for image and depth feature extraction in the perception system of FIG. 2. Using the two backbone networks of FIG. 3, the perception system 200 may project features (for example, objects, terrain, depth information, and so forth) computed from a point cloud, for example disparity, elevation, local surface normal, and so forth into each RGB sensor viewpoint. The image and depth features extracted from the two modalities (RGB and LIDAR) may be combined via deep or late integration and used for segmentation, depth completion, and 3D object detection tasks, as described further below.

The first backbone network for image feature extraction comprises a source 302 for RGB sensor data 352, for example an RGB sensor. The RGB sensor data 352 is passed to an image backbone network 306. The image backbone network 306 generates an output RGB feature data 356, which is passed to a feature integration module 310. The second backbone network for depth feature extraction comprises a source 304 for depth sensor data 354, for example the LIDAR sensor referenced herein. The depth sensor data 354 is passed to a depth backbone network 308, which generates output depth feature data 358 to pass to the feature integration module 310.

In some embodiments, the RGB and depth features of the RGB data 352 and the depth feature data 354 are spatially aligned, for example before feature extraction is performed. Accordingly, a pixelwise integration is performed using one or both of the deep and late integration techniques for combining the depth and image features. In some embodiments, the feature integration module 310 may perform the pixelwise integration to generate the combined features. The generated combined features may then be used for segmentation, depth completion, and 3D object detection tasks at blocks 312, 314, and 316, respectively. In such networks as shown, each of the image backbone and depth backbone networks 306 and 308, respectively, have only visibility to one camera viewpoint. Decisions from overlapping regions may be handled in by one of the object tracking and future state prediction module 214 or the probabilistic 3D map module 216 or the BEV map module 218.

In some embodiments, the backbone networks utilize or comprise one or more encoder convolutional neural networks with decreasing computational complexities, such as VGG, ResNet50, ResNet18, MobileNet, EfficientNet, and so forth. In some embodiments, the segmentation module 312 may apply various approaches, for example (1) an atrous feature pyramid pooling, such as DeepLabV3 & PSPNet, or (2) a multi-resolution decoder convolutional neural network, such as U-Net. In a multi-resolution setup, encoder features from both RGB sensor and LIDAR sensor modalities at different resolutions may be pulled and combined together before being passed to the decoder network of the segmentation module 312.

In some embodiments, the depth completion module 314 comprises a dense depth prediction network that shares a same front-end as the segmentation module 312 (for example, the upstream components 302-310 of FIG. 3), except that the depth completion module 314 will use a regression layer instead of a classification layer. Finally, for 3D object detection by the 3D object detection module 316, the perception module 200 may perform two stage approaches with region proposals (for example, Frustum-PointNet, MV3D) as well as single stage approaches (for example, CenterNet). In some embodiments, depth completion comprises identifying a prediction of a depth for each pixel in an image captured by the RGB sensor. Because LIDAR depth information is sparser than RGB depth information, the LIDAR depth information is missing information. The same may apply for stereo depth information, for example around object surfaces. Therefore, the RGB context information and known depth information is used to identify the depth for each pixel of the RGB image. Holes in the LIDAR and stereo depth information may be filled using a supervised machine learning ("ML") system, where the ML system predicts missing information based on the known information. The ML system may be trained using an autonomous system (not shown here) having different array of sensors that collect and provide denser information than the sensors of the robotic system 101. Alternatively, the ML system can be trained by inserting 3D models of objects into an environment where the distance from the robotic system 101 and the inserted 3D models are known for use as training data.

Figure 3:
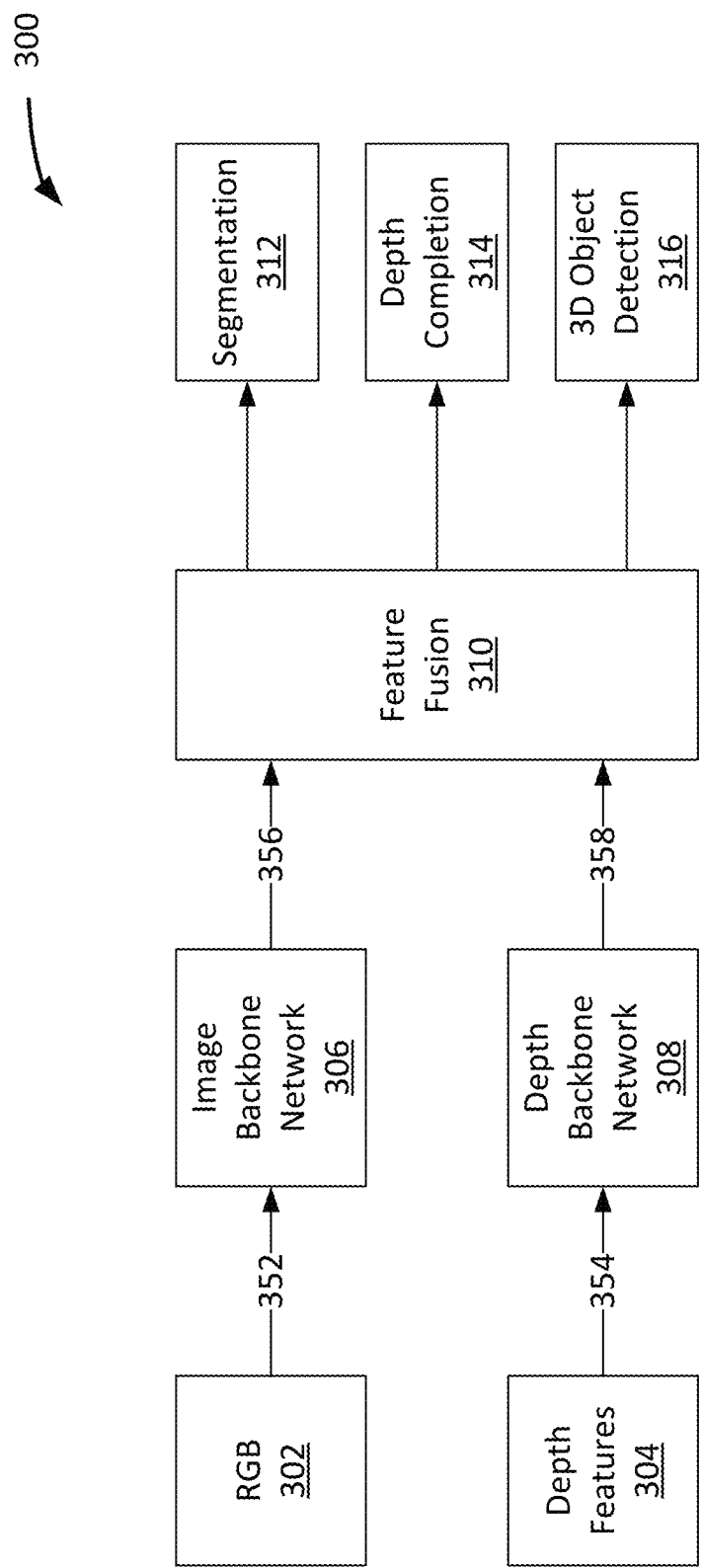
FIG. 3 is a flow diagram showing two backbone networks for image and depth feature extraction in the perception system of FIG. 2.

Effectively, the flow diagram 300 of FIG. 3 shows that depth features (for example, from the LIDAR sensor) and other sensor features are projected into a viewpoint of the RGB sensor. When these features share the viewpoint of the RGB sensor, the backbone networks (for example, the image backbone network 306 or the depth backbone network 308) may perform feature extraction (extracting features in the data 356 and 358) which are then combined by the feature integration module 310 before the further analysis of the segmentation module 312, the depth completion module 314, and the 3D object detection module 316. More simply stated, features from the LIDAR data (and other sensors) are projected onto features of the RGB data. When the features overlap, the backbone networks may have more information for feature detection and when there is little or no overlap, the context information from the RGB data alone may be for feature detection. The feature integration is performed on any of the features detected and then the further processing by the modules 312-316 is completed.

In some embodiments, the perception system 200 may use a similar network system (for example, the two backbone networks of FIG. 3) to generate data for a panoramic viewpoint. However, instead of projecting the RGB image data and depth feature data generated from the point cloud into each RGB sensor viewpoint, the perception system 200 may project all of the images and the depth features generated from the point cloud into the same image plane to generate a panoramic view from an integration of all of the RGB images. Therefore, further processing of the combined data may involve larger receptive fields and, therefore, additional context data.

For example, features are extracted from every RGB sensor viewpoint and every other sensor viewpoint and the information is combined using geometric warping or merging into or with data from other sensor types. For example, LIDAR features are obtained and geometrically warped into the data from the RGB sensors for the semantic segmentation (for example, by the segmentation module 312), the obstacle detection, and the depth completion (for example, by the depth completion module 314) while the features from the RGB sensor data are merged or applied to the LIDAR sensor data for 3D object detection, for example by the 3D object detection module 316. Effectively, when the processing (e.g., the segmentation, depth completion, or 3D object detection) is more efficient or effective in one sensor domain over another, the features from other sensors are warped into that one sensor domain for that particular processing. Thus, cross features are used from cross components for the integration to take place in the sensor domain having the most information or most critical information. For example, for semantic segmentation, the increased context and information in the RGB sensor data as compared to the sparser LIDAR data suggests merging the LIDAR data or other depth data into the RGB sensor data and doing corresponding predictions/analysis with emphasis on the RGB sensor data. For 3D object detection, where bounding box location and sizing is more important and more accurately determined from LIDAR sensor data, the RGB data is merged into the LIDAR sensor data to complete that analysis. As described herein, when data from a first sensor is merged with data from a second sensor, the data from the first sensor is used to complement the data from the second sensor. In some embodiments, one or more steps, routines, or processes described with relation to FIG. 3 may be implemented by one or more of the components described herein, for example one or more of the components of FIG. 2, such as the RGB Depth Fusion Network module 208.

In some aspects, outputs of ML networks and components used herein, for example neural networks applied in backbone networks, may apply a softmax function to normalize object class scores for a pixel across all possible object classes so that the sum of all object class scores is 1. As such, the object class of all possible object classes having the highest value or score is selected to be the label for the pixel. As an example, an output of the segmentation module 312 includes a H×W×N channel matrix where H×W is an input RGB image size in pixels and N is a number of semantic labels or channels (such as road, sidewalk, and so forth). Each channel may correspond to a certain label, (for example, channel 0 corresponds to the sidewalk label, channel 1 corresponds to the road label, and so forth, and each channel may have a score that is representative of a likelihood that that pixel should be labeled according to that channel. For each pixel location in the H×W image, a sum of N label or channel scores is always 1. The segmentation module 312 may select the channel for each pixel that has a highest score to label the pixel and uses the score for that channel as the confidence score for that pixel. For the 3D object detection module 316, similarly the outputs of the corresponding ML networks and components used therein produce a 1×K normalized class score vector, where K is a number of types of objects (such as person, car, and so forth) that may be detected in the environment of the robotic system 101.

In some embodiments, the perception system 200 combines sensor data to generate a multi-channel BEV feature encoding based on the point cloud (for example, using the MV3D or similar approaches). The multi-channel BEV feature encoding may be combined with a panoramic camera viewpoint. The combined panoramic viewpoint may be generated as described above. Fusing the BEV with the panoramic viewpoint may provide various advantages, for example by preserving the size and scale of objects in the view. However, because fusing features from different viewpoints can be challenging with respect to pixelwise tasks, the perception system 200 may implement a deep continuous integration pointwise integration approach or a spatial transform network for the integration of the panoramic viewpoint and the BEV. FIG. 4 is a flow diagram 400 showing backbone networks (for example, one each for image, depth, and BEV) used to generate the combined panoramic viewpoint and BEV with the perception system of FIG. 2. The three backbone networks of FIG. 4 may receive multi-view viewpoints (for example, images and point clouds combined into the multi-view viewpoints), as described in more detail below.

Figure 4:
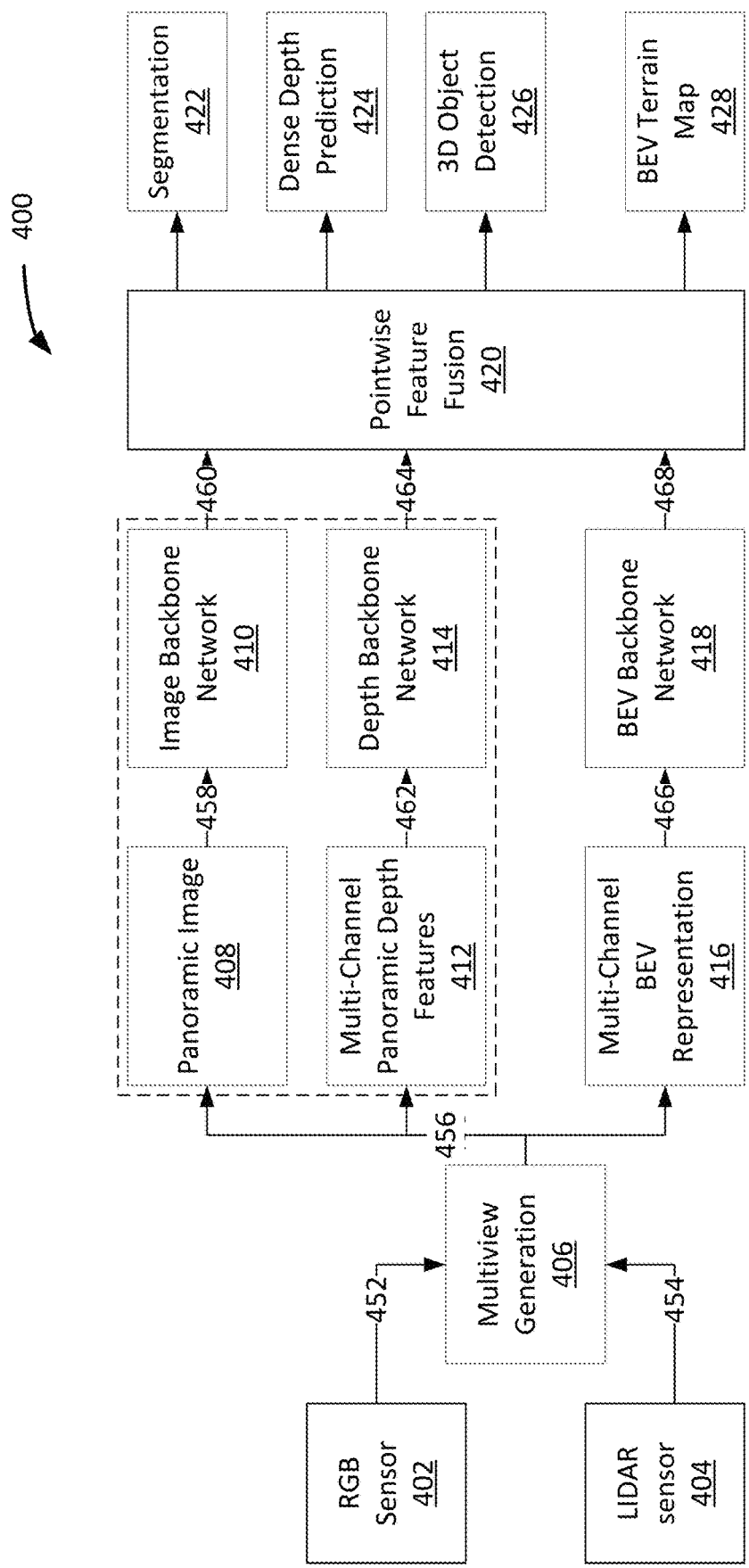
FIG. 4 is a flow diagram showing how multiple views generated from images and data captured via the perception system are combined to further generate information that the autonomous system of FIG. 1 uses to transport items from the first location to the second location.

The flow diagram 400 of FIG. 4 shows how the multi-views generated from the RGB image and point cloud data captured via the sensor framework are combined to further generate information that the autonomous system of FIG. 1 uses when transporting objects from the first location to the second location. RGB image data 452 (for example from an RGB sensor 402) and point cloud data 454 (for example, from a LIDAR sensor 404) are combined by a multi-view generation module 406 to generate multi-view viewpoints 456 for the environment in which the robotic system 101 operates. The multi-view viewpoints 456 may comprise panoramic and BEV representations passed to each of the three networks shown in FIG. 4. For example, the multi-view viewpoints 456 generated by the multi-view generation module 406 may feed each of the image leg, depth leg, and the BEV leg. The image leg utilizes a panoramic representations module 408 to extract or otherwise identify panoramic images 458 from the multi-view viewpoints 456 and passes the panoramic image 458 to the image backbone network module 410, which may correspond to the image backbone network module 306 of FIG. 3. The image backbone network module 410 may extract image features 462 from the panoramic images 458 and convey the image features 460 to a pointwise feature integration module 420. Similarly, the depth leg of the perception system 200 utilizes a multi-channel panoramic depth features module 412 to extract or otherwise identify depth features 462 of the multi-view viewpoints 456 and passes the depth features 462 to the depth backbone network module 414, which may correspond to the depth backbone network 308 of FIG. 3. The depth backbone network module 414 may extract multi-view depth features 464 from the RGB sensor images 458 and convey the multi-view depth features 464 to the pointwise feature integration module 420. The BEV leg of the perception system 200 utilizes a multi-channel BEV representation module 416 to extract or otherwise identify BEV representations 466 of the multi-view viewpoints 456 and passes the BEV representation 466 to the BEV backbone network module 418. The BEV backbone network 418 may extract multi-view BEV features 468 from the BEV representations 466 and convey the multi-view depth features 468 to the pointwise feature integration module 420.

In some embodiments, the pointwise feature integration module 420 combines the image features 460 extracted by the image backbone network module 410 with the corresponding depth features 464 extracted by the depth backbone network module 414, and with the BEV features 468 extracted by the BEV backbone network module 418. The pointwise feature integration module 420 may combine these features together to generate information or data for use by one or more of a segmentation module 422, a dense depth prediction 424, or a 3D object detection module 426. As such, the combined features may be used to perform segmentation, dense depth prediction tasks, or object detection. In some embodiments, the pointwise feature integration module 420 may combine the features described above together to generate a BEV terrain map using the BEV terrain map module 428. Semantic segmentation, as described herein, involves associating each pixel in an image with a particular class. Thus, the semantic segmentation performed by the segmentation module 422 may involve classifying each of the pixels of the combined images to identify a terrain of the pixel, whether the pixel is occupied, and so forth. In some embodiments, one or more steps, routines, or processes described with relation to FIG. 4 may be implemented by one or more of the components described herein, for example one or more of the components of FIG. 2, such as the RGB Depth Fusion Network module 208.

Figure 5:
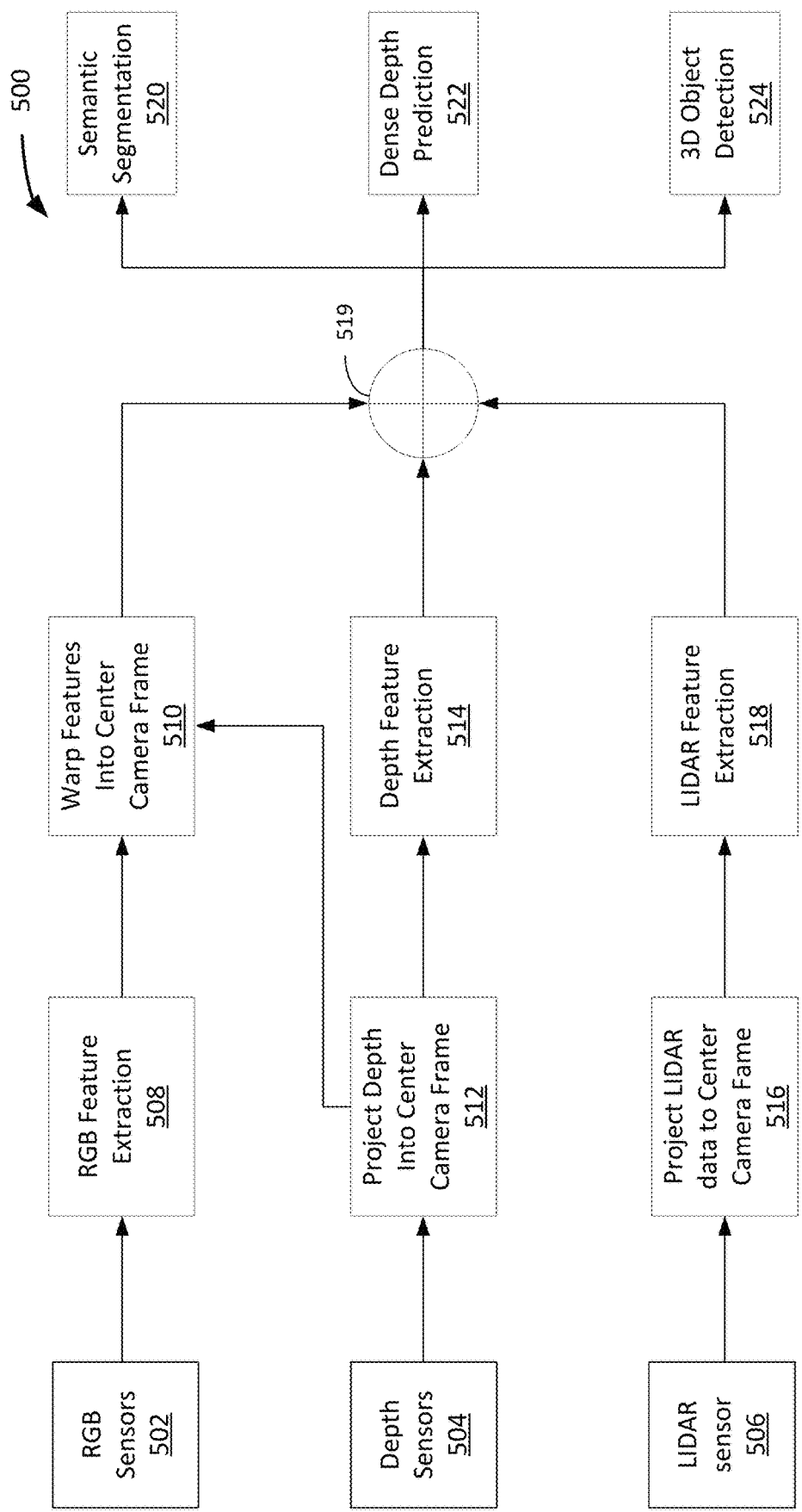
FIG. 5 is a flow diagram showing how data from multiple RGB sensors can be combined with data from multiple stereo depth sensors and data from a LIDAR sensor at the autonomous system of FIG. 1 to generate information to navigate the autonomous system through an environment.

FIG. 5 is a flow diagram of a framework 500 showing how data from multiple RGB sensors can be combined with data from multiple stereo depth sensors and data from a LIDAR sensor at the autonomous system of FIG. 1 to generate information to navigate the autonomous system through an environment. The perception system 200 of FIG. 2 may process inputs from the RGB sensors, the depth sensors, and the LIDAR sensor of the sensors 202 to generate information for use when navigating the robotic system 101 through the environment. The perception system 200 may combine sensor data from one or more sensors or inputs using deep learning to improve prediction accuracy for identifying objects, obstacles, terrains, and so forth in the environment of the robotic system 101. The perception system 200 may utilize the framework 500 to combine information from multiple sensors and sensor systems to generate a semantically labeled point cloud, 3D object detections, and dense depth completion in the environment of the robotic system 101. The perception system 200 may combine extracted features from different sensor data to improve prediction accuracy of the perception system 200 for navigating the robotic system 101 through the environment.

The perception system 200, as represented by the framework 500 of FIG. 5, may include a plurality of RGB sensors 502 (for example, each of a front right, center, and left mounted RGB sensor). As described above, each sensor may have a 70° horizontal and a 110° vertical FOV. The total field of view covered by all of the RGB sensors 502 is approximately 180 degrees (due to the overlap of the RGB sensors) The perception system 200 may also include a plurality of depth sensors 504, such as each of a front right, center, and left mounted depth sensor. The three stereo depth sensors may have similar FOVs as the RGB sensors 502. Additionally, the perception system 200 may include a LIDAR sensor 506 mounted with a view of the front of the robotic system 101, which may be a solid state LIDAR with a 110° horizontal and 32° vertical FOV. In some embodiments, the FOV and a resolution of data from different types of sensors can be different. In some embodiments, the RGB sensors 502 provide a higher resolution and FOV as compared to stereo depth sensors 504 and the LIDAR 506. The stereo depth sensors 504 may have a similar FOV and resolution as the RGB sensors 502 but have limited accuracy with stereo capabilities. For example, the stereo depth sensors 504 may generate incorrect depth predictions for objects, etc., or regions of the environment without any depth prediction when there are featureless objects (for example, a car parked on a sidewalk may not return stereo depth data other than edges of the car). Comparatively, the solid state LIDAR 506 may provide a lower FOV and resolution although depth data provided by the LIDAR 506 is more accurate than the depth sensors 504.

The flow diagram shows how different backbone networks are applied for each of the RGB sensors 502, the stereo depth sensors 504, and the LIDAR sensor 506 data streams to extract features from the sensor data. Those features are transformed to a common camera frame via extrinsic parameters (e.g., via a transformation matrix between sensor frames to common coordinate frame). After the transformation, the features are aligned (spatially or temporally) to be merged or combined. The perception system 200, for example via the framework of FIG. 5, supports different combination methods, for example averaging, max-pooling, or concatenation, among others. The combined features are inputs for various processing modules, for example a semantic segmentation module 520, a dense depth completion module 522, and a 3D object detection module 524. The 3D object detection module 524 may detect certain types of objects that the robotic system 101 encounters in the environment, such as a car, a bicycle, a person, a trash can, a stroller, a wheelchair, an animal, and so forth. The semantic segmentation module 520 may generate a static scene understanding as to where a sidewalk, a road, a driveway, and so forth is located, as well as where obstacles that the robotic system 101 does not encounter often, exist relative to the robotic system 101.

In general, LIDAR sensors have multiple vertical scan lines and scan the environment based on mechanical rotation. As such, the output of the LIDAR sensor comprises a stream of range data and corresponding pitch and roll angles of the LIDAR scan. The perception system 200 uses this range, pitch and roll angles information to compute [X,Y,Z] coordinates of points scanned by the LIDAR sensor with respect to a center of the LIDAR sensor. Extrinsic calibration (a relative location) between the LIDAR sensor and the RGB sensor to provide a rotation and translation matrix (R|t). Multiplying every [x,y,z] points by the [R|t] matrix gives coordinates of the scanned points from the LIDAR sensor in the RGB sensor frame. Intrinsic parameters of the RGB sensor may include it's focal length and image plane center, effectively describing a correspondence between the RGB sensor coordinates in metrics and image coordinates (for example, using simple pinhole camera model) in pixels.

In one embodiment, an N×4 matrix from LIDAR (where N is number of points, and each channel corresponds to range, pitch, roll and LIDAR intensity), is applied to the extrinsics transformation to find corresponding camera coordinates and uses intrinsics to find corresponding pixel coordinates. In an illustrative example, a LIDAR sensor with 32 scan lines, a 70 degrees horizontal FOV, and 0.5 degrees angular resolution may generate a 32×140 pixel image, where each channel includes additional information about the LIDAR scan, such as intensity, range, elevation, and so forth.

This image may be processed by the backbone networks, as described herein, to extract features from the image data. An output size of each backbone network is would differ depending on the details of backbone network, but the output is a 3D matrix (which, in some embodiments, can be considered as a list of concatenated 2D image features). Since the features extracted from different backbone networks are aligned (for example, based on the alignment of LIDAR and RGB sensor data described above), the perception system 200 (for example, via the RGB depth and fusion network module 208) can combine the features using simple arithmetic operations, such as averaging, max pooling (selecting the maximum value across channels for each pixel coordinate), or concatenating all the channels from different networks together.

Depth sensor data from the depth sensors 504 (for example, including depth data) may be projected into a center depth sensor of the depth sensors 504 at block 512. Such a projection process may effectively merge the stereo depth data or images from the individually three stereo depths sensors 504 into a single depth image that is aligned with the center camera, via camera extrinsic and intrinsic parameters. Camera extrinsic parameters may comprise camera parameters that are not particular to the sensor or camera and change with respect to the environment. The extrinsic parameters may define a position of the camera or sensor center and the camera's or sensor's heading in environmental or world coordinates or represent a location of the camera or sensor in the environment. The extrinsic parameters can be used to transform points in the environment to camera coordinates, which may be mapped into an image plane using the intrinsic parameters. The camera intrinsic parameters may linear or nonlinear and may comprise parameters for the camera or sensor that are particular to the camera or sensor setup and may represent an optical center of the image plane and a focal length of the camera or sensor. The single, merged depth image would provide the perception system 200 and the robotic system 101 with a 180×110° FOV. At block 514, the perception system 200 performs feature extraction (for example, via a depth feature extraction or backbone network similar to those described with reference to FIGS. 3 and 4). The backbone network may comprise one or more of ResNet, PSPNet, Mobilenet, and so forth capable of extracting depth features from the single, merged depth image resulting from the block 512.

In some embodiments, the processing at block 508 comprises running a shared backbone network on the three RGB images generated by the three RGB sensors 502, for example via one or more of the RGB backbone networks of FIGS. 3 and 4. RGB sensor data from the RGB sensors 502 (for example, including color data and pixel data) may be processed by an RGB feature extraction module at block 508 to extract features from the RGB sensor data. Thus, at block 510, the extracted RGB features from the block 508 may be warped with or combined or projected into the frame of the center depth sensor of the depth sensors 504, similar to the projecting of the depth sensor data being projecting into a combined view at block 512. Those features extracted from the RGB sensor data may be projected back to the center depth sensor frame, for example using the depth values and camera extrinsic or intrinsic parameters described above. At block 516, the perception system 200 may compute a multichannel LIDAR image from data generated by the LIDAR sensor 506. Specifically, the perception system 200 may generate the LIDAR image based on the point cloud information generated by the LIDAR sensor 506 (for example, comprising range data). The LIDAR sensor 506 may return LIDAR data including channels that comprise elevation data of a returned point, range data from the LIDAR sensor, and LIDAR intensity information. At block 518, the perception system 200 applies a feature extraction or backbone network to the LIDAR image (for example, one or more of the feature extraction networks described in one or more of FIGS. 3 and 4) to extract features from the LIDAR image.

The perception system 200 may then combine or merge the extracted features from each of blocks 508, 514, and 518, for example at summation 519. The perception system 200 may use the results of the summation block 519 for processing by each of the semantic segmentation block 520, the dense depth prediction block 522, and the 3D object detection block 524. The processing at the summation block 519 may comprise one or more of summation, maximum pooling, average pooling, and concatenation, and so forth.

In some embodiments, the processing corresponding to FIGS. 3-5 is performed by the RGB depth network 208 of FIG. 2, where segmentation information generated by the segmentation module 312 or 422 and depth information generated by the depth completion module 314 may correspond to the labeled point cloud data 272 of FIG. 2 and the 3D object detection information generated by the 3D object detection module 316 or 426 may correspond to the 3D object proposal data 270 of FIG. 2.

In some embodiments, the framework 500 processes the sensor data (for example, the depth sensor data) in real-time (e.g., receives and processes the sensor data with the corresponding backbone network in real-time). Another option is for the framework 500 to combine sensor data (for example, the depth sensor data) from one of the sensor types from a combination of frames or times (for example, previous frames or times) to create a denser collection of data for processing by the corresponding backbone network. For example, multiple frames or times of depth sensor data from the depth sensors 504 may be combined to generate a denser point cloud representation (as compared to a single frame or time of depth sensor data), and the depth sensor backbone network (for example, the depth feature extraction 514 block) may process the denser point cloud representation to extract features identified in the denser point cloud representation. Such processing may be accomplished by the localization module 204 of FIG. 2. In some embodiments, the localization performed by the localization module is based on an Extended Kalman Filter (EFK) to estimate the 3D pose or ego-motion information of the robotic system 101. For example, changes in the 3D pose of the robotic system 101 between frames may be represented by a 3×4 rotation and a translation matrix). The perception system 200 may estimate the 3D pose, ego, or motion information from a wheel odometry, an IMU, and visual odometry. The perception system 200 may use a pose transformation matrix (P) to transform or project the point cloud from previous frames into a current frame when generating the denser point cloud data prior to the backbone network processes the dense point cloud data. For example, the point cloud at time t0 is transformed or projected to time t1 by multiplying the x,y,z coordinates of every point by the transformation matrix, which shows how much robot moved from time t0 to t1. In some embodiments, one or more steps, routines, or processes described with relation to FIG. 5 may be implemented by one or more of the components described herein, for example one or more of the components of FIG. 2, such as the RGB Depth Fusion Network module 208.

In some embodiments, the perception system 200 may add RGB values captured by the RGB sensors to corresponding 3D points. The perception system 200 may perform semantic segmentation and 3D object detection tasks using a PointNet-like network.

Additionally, the perception system 200 may further perform geometric obstacle detection and terrain estimation based on, for example, applying data integrated into a point cloud using a non-ML based object detection algorithm (for example, such as a normal distribution transform (NDT) or a digital terrain model (DTM). In some embodiments, other convolutional neural networks (CNNs) or geometric algorithms may be applied and evaluated to identify threshold accuracies of detection and terrain estimation for use in the obstacle detection and terrain estimation. Particular algorithms used to detect geometric obstacles and perform terrain estimation may be enabled or disabled as needed.

As part of object tracking, the robotic system 101 may track objects that the robotic system 101 encounters frequently. For example, autonomous systems 101 may come across same types of objects regardless of the particular deliveries the robotic system 101 is serving. For example, the robotic system 101 may often see people, cars, bicycles, wheelchairs, strollers, mailboxes, and the like. As the autonomous systems 101 contact different objects, details of the object (for example, size, speed, type of motion, and so forth) may be stored. Object tracking by the robotic system 101 may utilize multiple sources of data. For example, the sources of data include data from sensors or similar devices. Such a device may comprise a convolutional neural network based object detector that enables the robotic system 101 (for example, via the perception system 200 or similar computing or processing system) to generate or estimate two-dimensional (2D) or three-dimensional (3D) boundary or bounding boxes around detected objects. The CNN based object detector may further enable the perception system 200 to predict a class or confidence score (for example, for each of class and position confidences) for a detected object. The object tracking device may generate various outputs of information, including one or more:

a 2D or 3D position (x,y,z) in a sensor frame,
a 2D or 3D BEV bounding box,
an object class,
one or more confidence probabilities (for example, class or position).

Alternatively, the object detecting device may include, but is not limited to, a radar based object detector that estimates object positions (for example, in 2D or 3D space) and velocity. In some embodiments, the radar based object detector may generate one or more of:

2D or 3D position (x,y,z) in a sensor frame,
an object class, and
one or more confidence probabilities (for example, range and angular).

When tracking objects, the robotic system 101 (for example, via the perception system 200) the robotic system 101 may update state information for a tracked object. The state information may include one or more:

2D or 3D position (x,y,z) in the Odom frame,
2D footprint (w,d) or 3D bounding box (w,d,h),
an orientation in the Odom frame,
an object class,
a velocity vector, and
one or more confidence scores (for example, probabilities)

In some embodiments, the robotic system 101 may not be able to update all of the state information values identified above. For example, while many or all of the values may be determined when multiple sensors or devices are used to analyze the objects, not all the state information may be available all the time. For example, when the robotic system 101 uses a radar-based object detector, only the position and velocity estimate for the detected object is available. In some embodiments, a Kalman-based filter is used for state updates for stored objects. In some embodiments, when a new object is received or detected by the object detector, the new object may be associated with an existing list of objects being tracked, where if no match is found, then the new objected is added to the list of objects and the state of the new object is updated. In some embodiments, the robotic system 101 stores the list of objects in a database or a memory circuit.

When an object query is received regarding an object, the robotic system 101 may predict the object's new state based on a previous object state stored in the database or memory, a current position of the robotic system 101 in the corresponding Odom frame, and the object's motion model (for example, a future state prediction model). In some embodiments, the robotic system 101 may prune the list of objects, for example limiting the number of objects on the list, where the list is pruned at a predefined frequency or as part of the above updates and based on one or more of entry onto the list, the class type, or the distance from the robotic system 101. The list of objects may be pruned to reduce the computational or similar load.

In some embodiments, the robotic system 101 may use the late integration technique described herein to combine data to generate predictions for objects and terrains across different algorithms and time frames and to generate a probabilistic 3D map. As part of generating the 3D map, the robotic system 101 may partition the environment around the robotic system 101 into smaller volumes or spaces, where each partitioned volume maintains a state of its occupancy and class label (for example, terrain/non-terrain information, and so forth). In some embodiments, the robotic system 101 relies on 3D Odom frames to determine certain information, for example an accurate 6-degrees of freedom (DOF) pose for the robotic system 101. The autonomous system 100 may use such information determined from the Odom frames to continuously combine information related to different timestamps.

The autonomous system 100 may configure sizes or shapes of the 3D partitioned volumes that are mapped and tracked. The autonomous system 100 may use one or more strategies to partition the 3D environment into the 3D partitions. For example, a first strategy comprises dividing the 3D environment into 3D partitions using regular grids with fixed sizes (for example, volumes) and shapes. One advantage of the regular grids approach involves indexing the grids. The autonomous system 100 may access and update any grid with O(1) complexity. In some embodiments, the regular grid approach uses a circular buffer to prune 3D partitions outside a region of interest and to add new information (for example, new 3D partitions) as the robotic system 101 travels. In some embodiments, an NDT implementation uses regular grids and requires ~3 ms to update the grids as described.

An alternate strategy involves irregular grids with fixed sizes. This strategy may be similar to the regular grids strategy but with different 3D partition sizes. In some embodiments, the 3D partition sizes are determined based on a spatial position and distance from the robotic system 101. The irregular grids strategy may introduce challenges when transferring the partition information for 3D partitions as the robotic system 101 moves closer to the 3D partitions.

An additional strategy involves the robotic system 101 using a KD-tree like dynamic partitioning strategy to generate the 3D partitions. Such an approach may inherently support multi-resolution and different grid sizes but may require more complex pruning and merging strategies. In some embodiments, the robotic system 101 may implement a fixed sized voxel grid map with varying resolution based on a distance from the robotic system 101, a height, and a point cloud density. In some embodiments, each grid cell (or partition) of the map may have various attributes if they are available:

occupancy state and probability information (for example, occupied, free, unknown, and so forth), class and probability information for occupied cells (for example, terrain, non-terrain, and semantic label if available, and so forth).

In some embodiments, anything non-terrain is non-navigable space (obstacle) for the robotic system 101, while terrain can be navigable or non-navigable based on a semantic label (such as driveway, lawn) or geometry (e.g. hard curb) for that 3D partition.

In some embodiments, grid cell occupancy probabilities may be updated using one or more methods. Additionally, one or more methods may be used to enable the robotic system 101 to deal with dynamic content. In some embodiments, the robotic system 101 may project a 3D map into or onto a 2D occupancy/traversability map. Thereafter, the 3D map will be combined with other 2D predictions to generate, for example structured sidewalk boundary estimates as well as offline maps (2D or 3D). Such 2D and 3D offline maps may be used for motion planning and visibility analysis, for example by a navigation stack of the robotic system 101.

In some embodiments, as the perception system 200 analyzes the partitions of the maps, each partition analyzed is assigned a state, for example including whether the partition is traversable by the robotic system 101, what the terrain of the partition is, whether there is an object in the partition, and so forth. The perception system 200 may also assign each partition one or more scores that effectively grade or indicate a confidence level in the state assigned to the partition. In some embodiments, various factors help determine the score, including a number of sensors used to analyze the partition (for example, whether data from RGB sensors as well as LIDAR sensors cover the partition in question), a distance between the partition and the robotic system 101, details of the object predicted to be in the partition (for example, size, shape, type, and so forth), details of the terrain (for example, type), and so forth. In some embodiments, the score for the partitions may change as the robotic system 101 moves through the environment. For example, as the robotic system 101 moves through the environment, the robotic system 101 gets closer to particular partitions of the environment and the scores for the particular partitions may change (for example, increase as the analysis of data from the sensors 202 improves as the sensors 202 get closer to the particular partitions). For example, for a first scan of the particular partitions, the score may indicate 60% confidence, while subsequent scans may increase, for example to 72% confidence and 80% confidence. One or more models (for example a Gaussian model or Bayesian model) may be used to identify the confidence levels.

In some embodiments, as the robotic system 101 moves through the environment, the sensors 202 provide updated information and the various modules in the perception system 200 process, combine, and analyze the information dynamically and in real-time. For example, as the robotic system 101 travels down a sidewalk, different partitions in the generated maps may be updated.

The robotic system 101, as described herein, may be programmed or controlled to deliver objects from the first location (for example, from the transportation vehicle) to the second location (for example, a delivery or recipient address). In some embodiments, when the robotic system 101 is configured to carry and deliver multiple objects having different delivery addresses at once, the first location may be a first delivery address at which the robotic system 101 has already completed a delivery. Thus, the robotic system 101 may deliver objects in a daisy chained manner without having to return to the transportation vehicle between deliveries.

Using the various modules and algorithms described herein, the robotic system 101 may identify or generate a terrain map for the environment of the robotic system 101. The robotic system 101 may dynamically update or regenerate the terrain map as the robotic system 101 is traveling through the environment. The robotic system 101 may use the terrain map and the modules described herein to identify a path through the environment from the first location to the second location. For example, the robotic system 101 may use the terrain map to identify how to travel (for example, a path) from the first location to the second location while avoiding curbs that are too tall for the robotic system 101 to climb, avoid obstacles such as people, fences, mailboxes, and automobiles in a roadway or parked on driveways or blocking sidewalks in the path of the robotic system 101.

In some embodiments, the perception system 200 generates the terrain map to enable the robotic system 101 to determine where to not travel, regardless of capabilities of the robotic system 101. For example, when delivering objects to a residential delivery address, the robotic system 101 may be configured to avoid traveling on lawns, through gardens, or underneath vehicles, among other scenarios. The robotic system 101 may use the terrain map to identify partitions in the terrain map that are not traversable. For example, the probabilistic 3D map module 216 or the BED map module 218 may identify partitions of generated maps that are traversable or not traversable using state identifiers for each partition. The state identifiers (or labels) may indicate which partitions are traversable and what the terrain is for each partition (for example, concrete—sidewalk, concrete—driveway, grass, mulch, dirt, sand, asphalt, and so forth). In some embodiments, the robotic system 101 is configured to travel over particular terrains if no other path is found, for example, if no other terrain is available. For example, if the second location is surrounded by grass with no driveway or sidewalk leading to a door, then the robotic system 101 may determine a need to travel on terrain partitions identified or labeled as grass. In some embodiments, if a path from a concrete terrain to a door is formed by pavers or stones separated by grass, then the robotic system 101 determines that traveling across grassy terrain partitions separating concrete or stone terrain partitions is permitted. In some embodiments, the robotic system 101 may determine to traverse an otherwise not traversable terrain if searching for an alternate path or route would increase inefficiencies in delivery of the corresponding object beyond a particular threshold or if such searching would leave the robotic system 101 in a resource depleted state (for example, with insufficient fuel to return to the transportation vehicle or so forth).

In some embodiments, the object tracking and future state prediction module 214 may provide state information for objects or obstacles in the environment of the robotic system 101 that are detected via the sensors 202. Such state information may then added to the maps generated by the probabilistic 3D map module 216 or the BEV map module 218 so that the robotic system 101 is able to track and predict motion and position of the objects or obstacles in the environment of the robotic system 101.

Example Computer System

Figure 6:
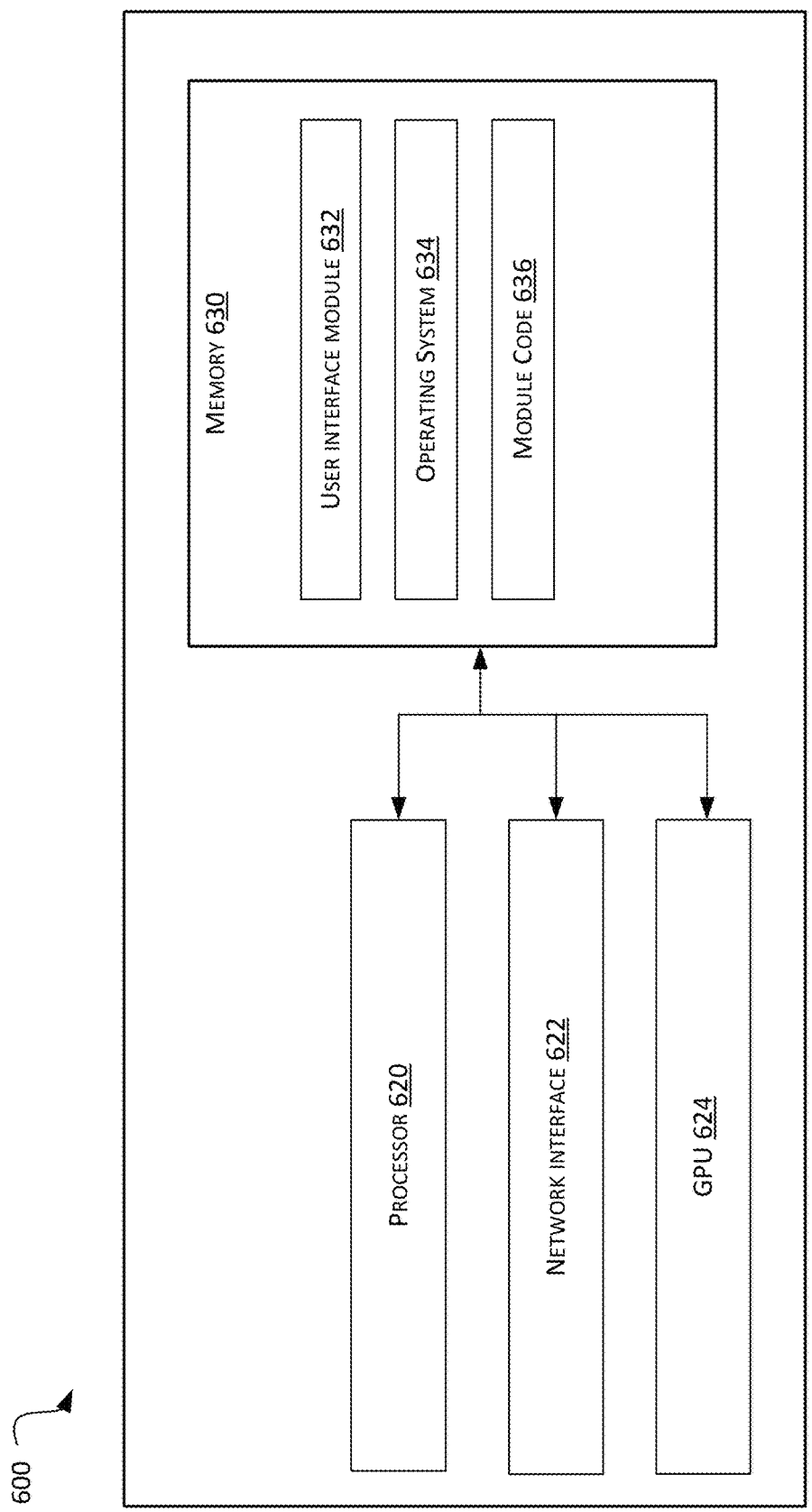
FIG. 6 depicts a general architecture of a computing device or system, for example of the autonomous system of FIG. 1 that implements the perception system of FIG. 2 to transport items from the first location to the second location.

FIG. 6 depicts a general architecture of a computing device or system, for example of the autonomous system of FIG. 1 that implements the perception system of FIG. 2 to transport objects from the first location to the second location. The general architecture of the computing device or system 600 depicted in FIG. 6 may correspond to the perception system 200, any processing or computer system of the robotic system 101, or any other computing or processing components described herein or that performs any processing or analysis described herein (for example, as shown in relation to FIGS. 2-4). The general architecture of the computing device or system 600 depicted in FIG. 6 includes an arrangement of computer hardware and software modules that may be used to implement one or more aspects of the present disclosure. The computing device or system 600 may include more (or fewer) elements than those shown in FIG. 6. It is not necessary, however, that all of these elements be shown in order to provide an enabling disclosure. As illustrated, the computing device or system 600 includes a processor 620 and a network interface 622 that may communicate with one another by way of a communication bus. The network interface 622 may provide connectivity to one or more networks or computing systems. The processor 620 may thus receive information and instructions from other computing systems or services via a network (not illustrated herein). As further illustrated, the computing device or system 600 further includes a graphical processing unit ("GPU") 624 that may communicate with the processor 620 and the network interface 622 by way of the communication bus. The GPU 624 may also communicate with the sensors 202 of the perception system 200 via the communication bus or similar network. The GPU 624 may perform analysis or processing of information obtained from the sensors 202. In some embodiments, the GPU 624 stores the data from the sensors 202 or stores the results of processing or analyzing the data from the sensors 202. The processor 620 may thus receive data from the sensors 202 or results from processing or analysis by the GPU 624. In some embodiments, the computing device or system 600 may be implemented with an NVidia Jetson Xavier NX system on a module.

The processor 620 may also communicate with the memory 630. The memory 630 may contain computer program instructions (grouped as modules, algorithm, and the like, in some embodiments) that the processor 620 executes in order to implement one or more aspects of the present disclosure. The memory 630 may include RAM, ROM, or other persistent, auxiliary, or non-transitory computer-readable media. The memory 630 may store an operating system 634 that provides computer program instructions for use by the processor 620 in the general administration and operation of the robotic system 101, perception system 200, the sensor stack, the localization stack, or the navigation stack. The memory 630 may further include computer program instructions and other information for implementing one or more aspects of the present disclosure. Additionally, the memory 630 further includes computer program instructions and other information for one or more modules (e.g., a modules code 636). For example, each of the modules described above with relation to FIGS. 2-4 (for example, one or more of the localization module 204, the RGB depth network module 208, the geometric obstacle detection and terrain estimation module 210, the object tracking and future state prediction module 214, the probabilistic 3D map module 216, the BEV map module 218, the image backbone network 306, the depth backbone network 308, the feature integration module 310, the segmentation module 312, the depth completion module 314, the 3D object detection module 316, the multi-view generation module 406, the panoramic image module 408, the multi-channel panoramic depth features module 412, the multi-channel BEV representation module 416, the image backbone network 410, the depth backbone network 414, the BEV backbone network 418, the pointwise feature integration module 420, the segmentation module 422, the dense depth prediction module 424, the 3D object detection module 426, or the BEV terrain map module 428. In some embodiments, the these modules comprise code or algorithms that enables the processor 620 to perform the steps or analysis described herein to combine information and data to generate the segmentation, detection, or mapping results desired, as described herein. For example, the 3D object detection module 426 may include instructions for processing inputs received from the integration performed by the pointwise feature integration module 420 to detect objects in the environment of the robotic system 101. In some embodiments, the memory 630 further includes the various algorithms described herein that allow the processor 620 to perform the analysis and operations attributed to the modules described herein. In some embodiments, the module described herein include code enabling the processor 620 to combine inputs, detect features or representations from data, calculate predictions, and so forth, as described herein. Furthermore, in one embodiment, the memory 630 includes a user interface module 632 that generates user interfaces (or instructions therefor) for display upon a user computing device, e.g., via a navigation or browsing interface such as a browser or application installed on the user computing device. In addition, the memory 630 may include or communicate with one or more data stores.

While the various module are shown in FIG. 6 as part of the computing device or system 600, in other embodiments, all or a portion of the modules described herein may be implemented by the processor 620 or processors of other remote computing devices or systems. For example, in certain embodiments of the present disclosure, another computing device in communication with the computing device or system 600 may receive implemented the modules communicated to the other computing device from the computing device 600.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid-state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources multiple distinct business entities or other users share.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. A hardware-based computer processor of the computing device may then execute the executable instructions. In some embodiments, such processes or portions thereof may be implemented on multiple computing devices or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for comparing image information acquired by a delivery device, the system comprising:
    an RGB sensor configured to provide context data;
    a LIDAR sensor configured to provide range information;
    a depth sensor configured to provide depth information;
    a hardware processor configured to:
        extract RGB features from the context data, LIDAR features from the range information, and depth features from the depth information;
        combine the extracted features from at least two of the RGB sensor, the LIDAR, and the depth sensor to form environment data for the environment around the delivery device;
        generate a terrain model based on the environment data, the terrain model including a plurality of terrain types;
        detect an object based on the environment data;
        generate, based at least in part on the environment data:
            a dense point cloud and pose information output; and
            3D pose and covariance matrix data;
        combine the context data from the RGB sensor with the dense point cloud and pose information output;
        generate object proposal data for the detected object and labeled point cloud data;
        generate object states for the detected object; and
        generate a map for an environment in which the delivery device operates based on the terrain model, the detected object, the generated object proposal data, the labeled point cloud data, and the object states;
    a program interface configured to provide access to generated information and the map of the environment of the delivery device; and
    a navigation system configured to navigate the delivery device by processing the generated information and the map of the environment and determining a traversal path through the environment, wherein, during the navigation, the traversal path is determined based at least in part on traversability scores for individual terrain types of the plurality of terrain types, and wherein the traversability scores are measured based on traversability of each pixel or portion of the map relative to other pixels or portions of the map during the navigation.

2. The system of claim 1, wherein the hardware processor is further configured to receive offline map data for the environment of the delivery device and wherein the processor is configured to generate the map for the environment further based on the received offline map data.

3. The system of claim 1, wherein the hardware processor is further configured to partition the map into a plurality of partitions according to a grid, wherein each of the plurality of partitions represents a different portion of the environment.

4. The system of claim 3, wherein the grid results in each of the plurality of partitions of the map having one of a same volume and same shape or a same volume but different shape.

5. The system of claim 3, wherein the hardware processor is further configured to generate the map for the environment to identify the detected object in one of the plurality of partitions relative to a location of the delivery device.

6. The system of claim 3, wherein the hardware processor is further configured to track the detected object as it moves between partitions of the plurality of partitions and predict a future movement of the detected object.

7. The system of claim 1, wherein the hardware processor is further configured to partition the map into a plurality of partitions and assign at least one terrain label to each partition, wherein each of the plurality of partitions represents a different portion of the environment.

8. The system of claim 1, wherein the hardware processor is further configured to identify a confidence score for the detected object, wherein the confidence score indicates a probability that state information identifying the detected object is correct.

9. A method for managing operation of a vehicle, the method comprising:
  obtaining color data and neighboring pixel data of at least a portion of an environment of the vehicle using an RGB sensor;
  combining the color data and the neighboring pixel data with range data obtained from a LIDAR sensor to form environment data;
  identifying a plurality of terrain types in the environment based on the environment data and pre-existing map information;
  identifying features in the environment at locations relative to the vehicle based on the environment data and the pre-existing map information; and
  generating a map for the environment based on the plurality of terrain types, the identified features, the environment data, and the pre-existing map information;
  navigating the vehicle by processing the map for the environment and determining a traversal path through the environment, wherein, during the navigation, the traversal path is determined based at least in part on traversability scores for individual terrain types of the plurality of terrain types, and wherein the traversability scores are measured based on traversability of each pixel or portion of the map relative to other pixels or portions of the map during the navigation.

10. The method of claim 9, wherein identifying features in the environment comprises detecting an object in the environment based on the color and neighboring pixel data and the range data.

11. The method of claim 9, wherein identifying features in the environment at locations relative to the vehicle comprises:
  identifying a location of the vehicle in the environment based on the pre-existing map information, the color and neighboring pixel data, and the range data; and
  identifying locations for the features in the environment based on the pre-existing map information, the color and neighboring pixel data, and the range data.

12. The method of claim 9, wherein combining the color and neighboring pixel data and the range data comprises generating a point cloud and pose information based on the combined color data, neighboring pixel data, and range data.

13. The method of claim 9, further comprising partitioning the generated map into a plurality of partitions according to a grid, wherein each of the plurality of partitions represents a different portion of the environment.

14. The method of claim 13, wherein the grid results in each of the plurality of partitions of the map having one of a same volume and same shape or a same volume but different shape.

15. The method of claim 13, further comprising identifying the features in particular partitions of the partitioned map relative to a location of the vehicle.

16. The method of claim 13, further comprising assigning at least one terrain label to each partition.

17. The method of claim 13, further comprising tracking an object as it moves between partitions of the plurality of partitions and predicting a future movement of the object.

18. One or more non-transitory computer-readable media comprising computer-executable instructions that, when executed by a computing system, cause the computing system to:
  process, from a plurality of sources comprising a plurality of sensors mounted to a delivery device or at least one sensor mounted to the delivery device and a map source including a map of an environment of the delivery device, a plurality of respective inputs;
  extract features from each of the plurality of respective inputs;
  identify a plurality of features in the environment of the delivery device at locations relative to the delivery device based on a combination of extracted features from two or more of the plurality of respective inputs, the plurality of features including a plurality of terrain types, wherein each of the plurality of identified features is associated with state information identifying the identified feature;
  identify confidence scores for each of the identified features, wherein the confidence score indicates a probability that the state information for each identified feature is correct; and
  navigate the delivery device through the environment to deliver an item from a first location to a second location based on a partitioned map for the environment, the identified plurality of features in the environment, and traversability scores for individual terrain types of the plurality of terrain types, and wherein the traversability scores are measured based on traversability of each pixel or portion of the map relative to other pixels or portions of the map during the navigation.

19. The one or more non-transitory computer-readable media of claim 18, wherein the instructions further cause the computing system to generate the partitioned map based on the plurality of respective inputs and pre-existing map data.

20. The one or more non-transitory computer-readable media of claim 19, wherein the instructions that cause the computing system to identify the plurality of features in the environment at locations relative to the delivery device comprise instructions that cause the computing system to:
  identify a location of the delivery device in the environment based on the pre-existing map data and sensor data from the at least one sensor; and
  identify locations for the identified features in the environment based on the pre-existing map data and sensor data from the at least one sensor.

* * * * *

UNITED STATES PATENT AND TRADEMARK OFFICE
CERTIFICATE OF CORRECTION

PATENT NO. : 11,967,161 B2
APPLICATION NO. : 16/914189
DATED : April 23, 2024
INVENTOR(S) : Hakan Boyraz et al.

It is certified that error appears in the above-identified patent and that said Letters Patent is hereby corrected as shown below:

In the Specification

At Column 13, Line 55, delete "The" and insert -- the --.

At Column 18, Line 66, delete "that that" and insert -- that --.

At Column 23, Line 50, delete "(EFK)" and insert -- (EKF) --.

At Column 24, Lines 66-67, delete "probabilities)" and insert -- probabilities). --.

Signed and Sealed this
Twentieth Day of August, 2024

Katherine Kelly Vidal
*Director of the United States Patent and Trademark Office*